US006503287B1

(12) United States Patent
Schraven

(10) Patent No.: US 6,503,287 B1
(45) Date of Patent: Jan. 7, 2003

(54) SYSTEM AND METHOD OF SOIL DISTRIBUTION, SUCH AS A SOIL BLEND, CAPABLE OF BEING BLOWN INTO PLACE

(76) Inventor: Hendrikus Schraven, 14461 Tiger Mountain Rd. SE., Issaquah, WA (US) 98027

( * ) Notice: Subject to any disclaimer, the term of this patent is extended or adjusted under 35 U.S.C. 154(b) by 0 days.

(21) Appl. No.: 09/545,249

(22) Filed: Apr. 7, 2000

Related U.S. Application Data

(60) Provisional application No. 60/128,491, filed on Apr. 9, 1999.

(51) Int. Cl.$^7$ .................................................. C05F 3/00
(52) U.S. Cl. ...................... 71/11; 71/12; 71/13; 71/15; 71/17; 71/18; 71/20; 71/21; 71/22; 71/24; 71/29; 71/30; 71/33; 71/63
(58) Field of Search ................................. 71/11, 12, 13, 71/15, 17, 18, 20, 21, 22, 24, 29, 30, 33, 63

(56) References Cited

U.S. PATENT DOCUMENTS

| | | | | | |
|---|---|---|---|---|---|
| 17,237 | A | * | 5/1857 | Stearns | 71/13 |
| 3,802,089 | A | * | 4/1974 | Stephanoff | 34/8 |
| 4,006,004 | A | * | 2/1977 | Seferian et al. | 71/11 |
| 4,563,207 | A | * | 1/1986 | McKenzie | 71/21 |
| 4,589,225 | A | * | 5/1986 | Stensaas | 47/58 |
| 4,762,545 | A | * | 8/1988 | Youssef et al. | 71/27 |
| 5,240,490 | A | * | 8/1993 | Moore | 71/17 |
| 5,466,273 | A | * | 11/1995 | Connell | 71/11 |
| 5,634,959 | A | * | 6/1997 | Beaty | 71/16 |
| 5,698,110 | A | * | 12/1997 | Wyatt | 210/751 |
| 6,048,377 | A | * | 4/2000 | Kviesitis | 71/11 |
| 6,159,263 | A | * | 12/2000 | Aveer et al. | 71/11 |
| 6,228,806 | B1 | * | 5/2001 | Mehta | 504/117 |

FOREIGN PATENT DOCUMENTS

| | | |
|---|---|---|
| DE | 197 41 055 A1 | 3/1999 |
| EP | 0 504 089 A1 | 9/1992 |
| EP | 0 813 806 A1 | 12/1997 |

OTHER PUBLICATIONS

BloTech Systems—Web Site Printout, http://www.blotech.com/.html (Dec. 15, 2000).
Express Blower—Web Site Printout, http://expressblower.com/.html (Dec. 15, 2000).
Aliva Ltd., "Aliva 280 Universal, Wet and Dry Spraying Machine" May 1998.

* cited by examiner

*Primary Examiner*—Chhaya D. Sayala
(74) *Attorney, Agent, or Firm*—Seed IP Law Group PLLC

(57) ABSTRACT

A soil distribution system, and particularly a method of blowing topsoil, using an improved topsoil blend and specialized equipment, onto selected surfaces, including sloped surfaces. The topsoil blend may be placed either via traditional or selected placement means including placement by blowing the mixture into place. The topsoil blend may be blown through a manipulatable distribution line onto the surface, including areas which may be substantially inaccessible. A selected aerobic compost tea may be combined with the soil distribution operations such that the tea is distributed and intermixed with the soil as the soil is blown into place. Greensand may be distributed over the surface prior to blowing the soil in place and the soil is then distributed over the layer of greensand.

27 Claims, 15 Drawing Sheets

To start the soil blowing procedure is as follows:

> Equipment is tested by starting compressor first and blowing air through the hose until hose operator says air is flowing freely and he is ready to start receiving soil.

↓

> The hopper is turned on and the agitator is turned on.

↓

> The conveyor belt is turned on and soil begins to enter hopper in controlled manner.

↓

> Initial startup is observed with a very attentive and critical eye as this is the most potential time for any problem, i.e., clogging, to occur.

*Fig. 5*

To stop the soil blowing operation, the procedure is as follows:

> All parties are notified that the operation is going to stop.

↓

> All soil is stopped from entering hopper – conveyor truck is first to stop action.

↓

> Hopper becomes empty of soil and the agitator can be turned off. The compressor remains on and air is left blowing with empty hopper until hose operator confirms that there is NO soil moving through the lines anymore.

↓

> At this point the hopper and the compressor can be shut down.

*Fig. 6*

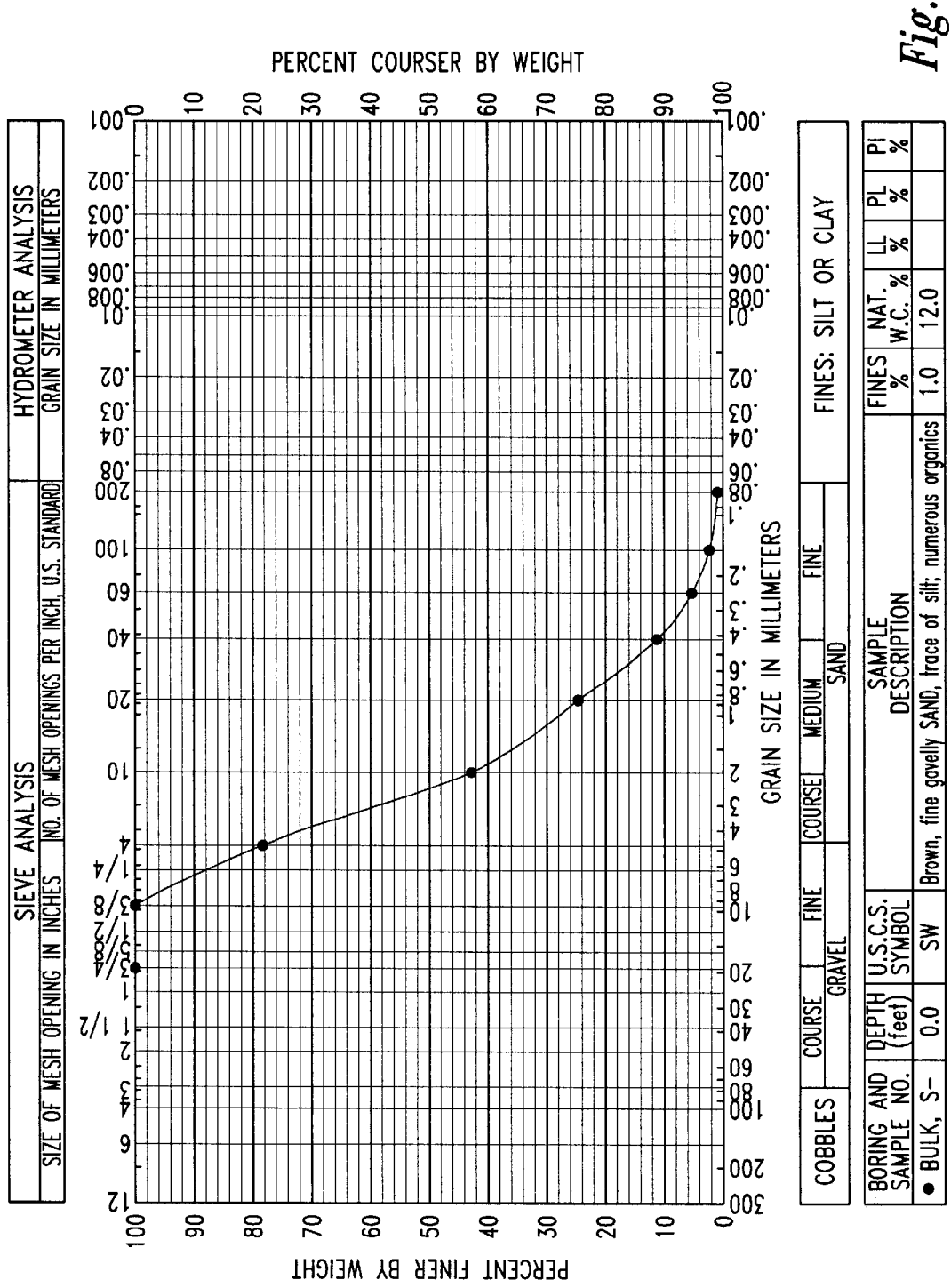
Fig. B1

TILT TABLE RESPONSE
SUMMARY OF TEST DATA

Equipment Information:
  Mass of Pan (lb)           0.8103
  Volume of Pan (ft$^3$)     0.0582

TILT TABLE DRY

| Trial | Mass of Dry Soil + Pan (lb) | Mass of Dry Soil (lb) | Dry Density (pcf) | ø for sliding of surface material | ø for sliding of entire block |
|---|---|---|---|---|---|
| 1 | 4.46 | 3.65 | 62.63 | 41 | 43 |
| 2 | 4.26 | 3.45 | 59.30 | NR | 39.5 |
| 3 | 4.42 | 3.61 | 61.96 | 44 | 46 |
| 4 | 4.34 | 3.53 | 60.65 | NR | 42 |
| 5 | 4.25 | 3.44 | 59.12 | 41 | 43 |

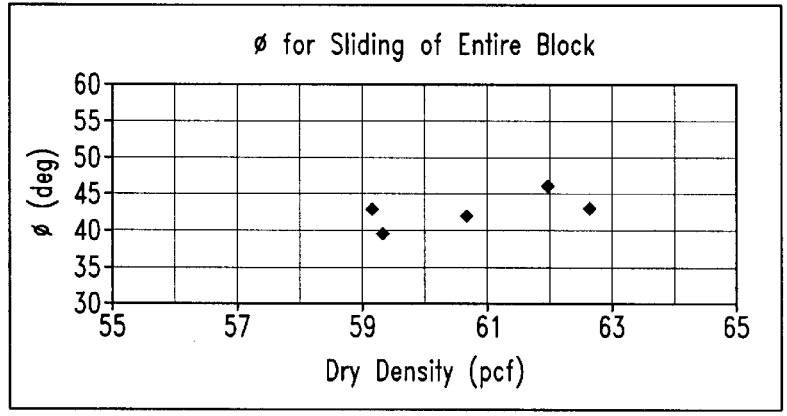

TILT TABLE SATURATED

| Trial | Mass of Dry Soil + Pan (lb) | Mass of Dry Soil (lb) | Dry Density (pcf) | Mass of Wet Soil + Part (lb) | Mass of Wet Soil (lb) | Wet Density (pcf) | Angle of sliding block |
|---|---|---|---|---|---|---|---|
| 1 | 4.52 | 3.71 | 63.76 | 6.33 | 5.52 | 94.86 | >50* |
| 2 | 4.23 | 3.42 | 58.75 | 5.85 | 5.04 | 86.54 | 61** |
| 3 | 4.32 | 3.51 | 60.27 | 6.19 | 5.38 | 92.39 | 72 |

\* full angle not reached due to equipment failure
\*\* soil not fully saturated, failure surface along an unsaturated plane

SUMMARY OF ø FROM VARIOUS TESTING METHODS

| Angle of repose | 40 |
|---|---|
| Direct Shear | 45 |
| Tilt Table Dry | 42.7 |

*Fig. B2*

DIRECT SHEAR TEST NO.
SUMMARY OF TEST DATA

| Boring | Tested By/Date WLB 8/26/99 |
| Sample | Calc. By/Date WLB 8/27/99 |
| Depth, ft. | Check By/Date |

| CLASSIFICATION: | SPECIMEN DATA: | Before Test |
|---|---|---|
| | Height, inches: | 1.491 |
| | Diameter, inches: | 4.500 |
| SAMPLE DATA: | Wet Density, pcf: | 60.2 |
| Spec. Grav. (est.): 2.50 | Dry Density, pcf: | 58.5 |
| Specimen :UNDISTURBED | Initial Water Content, %: | 3.0 |
| | Final Water Content, %: | 65.4 |
| | Hanger + Lever Tare, kg: | 7.01 |
| | Load on Hanger, kg: | .00 |
| | Load on Lever, kg: | .00 |
| | Normal Stress, tsf: | .07 |
| | Shear Defl. Const., in/div: | .000000 |
| | Shear Load Const., kg/div: | .328 |
| | Normal Defl. Const., in/div: | .001 |

| Elapsed Time min | Shear Defl. Read. div | Normal Defl. Read. div | Shear Load Read. div | Shear Displ. inches | Normal Displ. inches | Shear Strain % | Shear Stress tsf |
|---|---|---|---|---|---|---|---|
| 2.0 | 32.0 | 1.0 | 8.0 | .000 | .0010 | .0 | .03 |
| 5.0 | 80.0 | 2.1 | 11.0 | .000 | .0021 | .0 | .04 |
| 7.0 | 134.0 | 2.8 | 13.0 | .000 | .0028 | .0 | .04 |
| 10.0 | 224.0 | 3.1 | 16.0 | .000 | .0031 | .0 | .05 |
| 12.0 | 285.0 | 2.3 | 17.0 | .000 | .0023 | .0 | .06 |
| 15.0 | 377.0 | .8 | 19.0 | .000 | .0008 | .0 | .06 |
| 17.0 | 439.0 | -1.2 | 20.0 | .000 | -.0012 | .0 | .07 |
| 20.0 | 533.0 | -4.2 | 21.0 | .000 | -.0042 | .0 | .07 |
| 22.0 | 594.0 | -4.5 | 21.5 | .000 | -.0045 | .0 | .07 |

*Fig. B3*

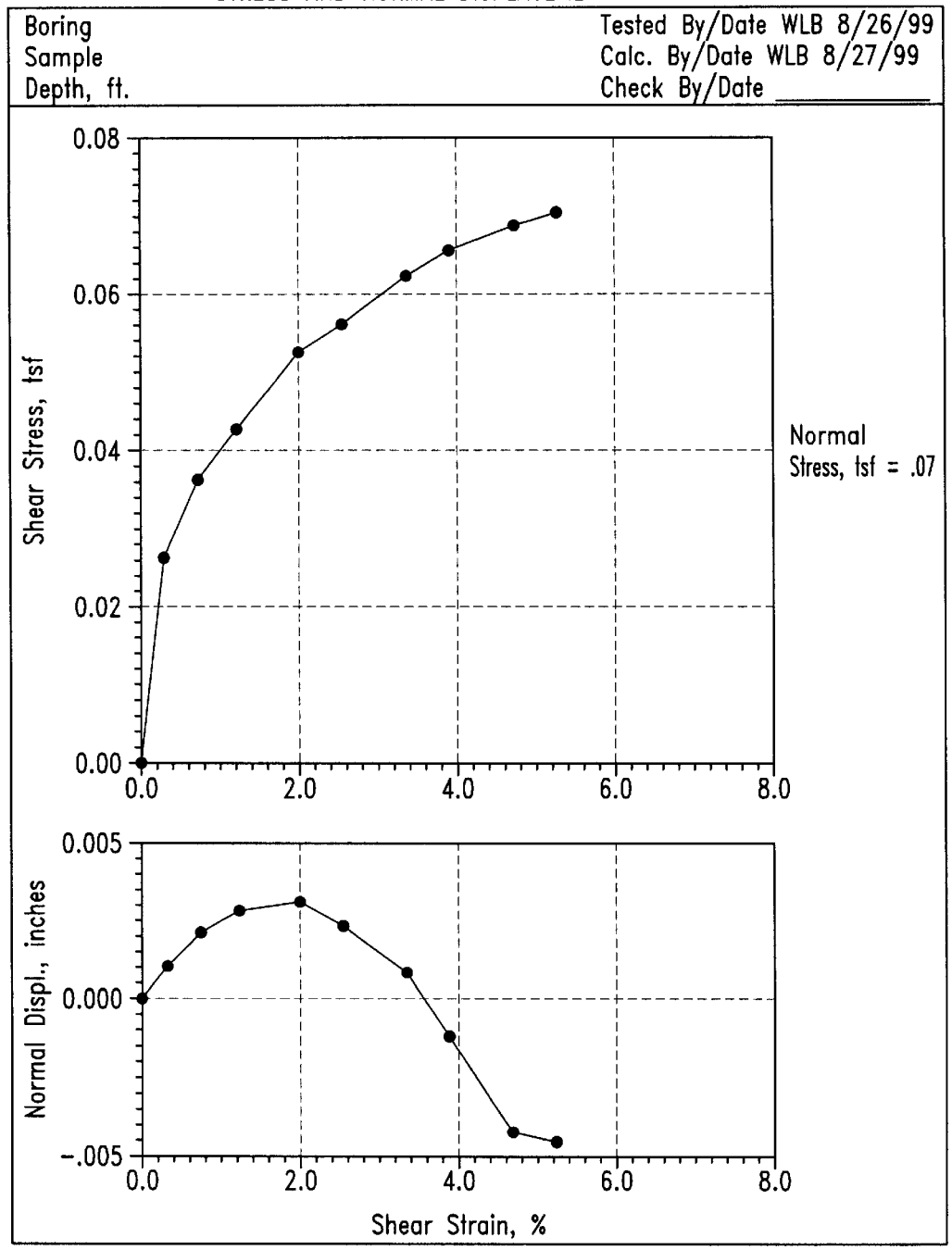
Fig. B4

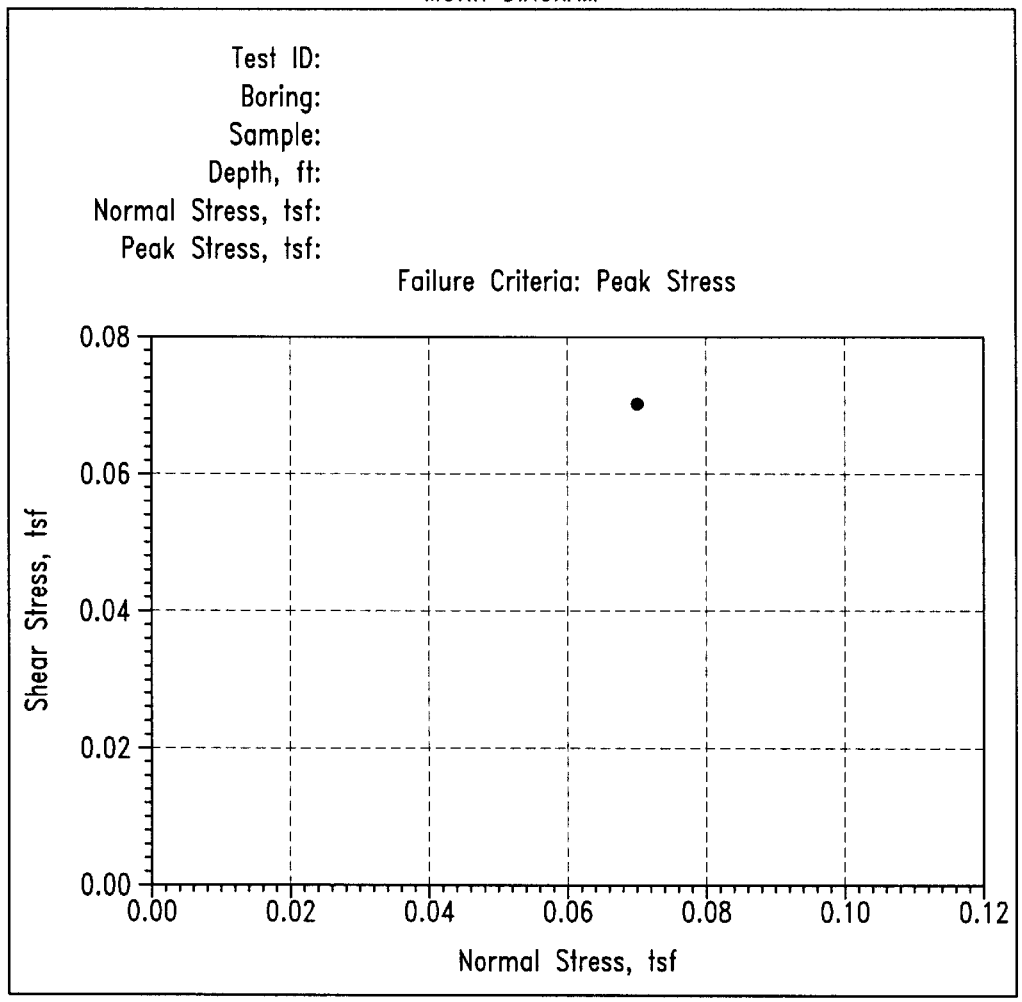
Fig. B5

SYSTEM AND METHOD OF SOIL DISTRIBUTION, SUCH AS A SOIL BLEND, CAPABLE OF BEING BLOWN INTO PLACE

CROSS-REFERENCE TO RELATED APPLICATION

This application claims the benefit of U.S. provisional application No. 60/128,491, filed Apr. 9, 1999.

TECHNICAL FIELD

This invention relates to soil mixtures and a soil distribution system, and more particularly, to an organic soil mixture and a soil distribution system that blows the soil mixture onto selected places on flat or sloped surfaces.

BACKGROUND OF THE INVENTION

Healthy topsoil and vegetation that grows in the topsoil are natural and effective stabilizers of soil layers on flat or sloped surfaces. If topsoil is removed from an area on a surface due to a landslide, development, or erosion, the topsoil should be replaced to ensure continued stability of the remaining soil and vegetation on the surface. The topsoil can be replaced naturally over a long, long time, or the topsoil can be manually replaced in a much shorter time period. Manually, replacing the topsoil on sloped areas has proven to be a dual challenge. The first challenge is in creating a soil mix with balanced permeability and stability characteristics for the particular geographic location. The second challenge is to physically access the slope and deposit enough of the soil mix to replace the topsoil in an efficient and economically justifiable manner.

Nature's process of death and rebirth creates the fertile topsoils, but nature's process is very slow. In the fall season, when deciduous trees, shrubs, vegetables and perennials die back and leaves fall to the ground, decomposition begins. Decomposition cycles create layers of topsoil, so the topsoil builds up layer by layer over time with each decomposition cycle. The variety of plant materials supported in these soils differs as the soil changes. Plants that need a less nutrient-rich soil will grow and die back, continuing the decomposition cycle and as the soil richens in nutrients, the plant varieties will change accordingly, continuing to add to the decomposition and buildup of topsoil. Micro-organisms are a key ingredient in the decomposition process as they break down the particles into the necessary elements for fertile soil. It takes nature an incredibly long time to create just one foot of topsoil. Yet this process that takes nature so very long can be wiped away in one pass of a bulldozer, or by a landslide on a slope, or by the effects of erosion over a relatively short period of time.

Fertile topsoil is soil teaming with life. It contains beneficial micro-organisms, including bacteria, fungi, protozoa, nematodes, micro arthropods, earthworms and other insects vital to soil structure and nutrient distribution. The fertile topsoil has a natural balance of nutrient and mineral ingredients, it has the natural ingredients of the food chain, that supplies us with minerals through the plant materials and fruits that grow in the topsoil. Live, healthy topsoil also has a natural permeability and stability that facilitates healthy growth of vegetation. Healthy, living topsoil filters and/or binds pollutants before they can reach waterways or aquifers.

Many areas, such as agricultural land or areas where there is little or no crop rotation, such as vineyards or orchards, have been negatively impacted by the inability to get topsoil to replace soil deficient in nutrients, microbes, or organic matter in a cost-efficient manner. Traditional transportation of topsoil to these locations included hauling the topsoil from trucks or large topsoil deposits to the selected areas by wheelbarrows, buckets, bags or conveyors.

In other areas, erosion and the development of land often stunt nature's progress with respect to topsoil. Hillsides are acutely vulnerable to topsoil erosion and, particularly in the Northwest region of the United States, are at risk for having a landslide activity. The same land characteristics that make hillsides vulnerable to erosion and landslides also make the hillsides difficult to repair. The steeper the slope, the more difficult it is to get people and equipment on the hillside itself in order to replace topsoil. It is also more difficult for standard topsoil to remain stable on the slope. Further, access to the slope is often very difficult because of existing site conditions, such as heavy vegetation, houses or other landscaping that prevents site access. Other hard to reach areas include landslide areas, waterfront hillsides where floating barges cannot land to off-load equipment and where slope severity does not allow equipment to descend, backyards with substantially no access, vineyards and orchards, and rooftop planters and container gardens.

Traditionally, repairing hillsides that were clear of obstacles included placing netting or other geo-tech fabrics over the repair area. However, both netting and geo-tech fabrics are cumbersome and expensive, and are not a realistic option when there are obstacles, such as existing partial vegetation cover, on the hillside. Geo-tech fabrics have the potential to damage roots by cutting or girdling.

Replacing the topsoil on a hillside encountered other difficulties including hillsides that were too steep to maneuver equipment on. Track equipment, such as excavators, bulldozers, track loaders, track hoes, motor graders, etc., can safely maneuver on up to a 3 to 1 slope. Manual work can continue on slopes steeper than 3 to 1, however, a 2 to 1 slope becomes difficult for manual work and virtually impossible for wheelbarrows.

Conventional techniques for replacing topsoil on steep slopes include using a chute system, in which one or more chutes are positioned over the hillside from the top of the hillside, and buckets full of topsoil are slid down the chutes as a means to manually bring the topsoil down to workers standing on the steep slopes. Conventional topsoil does not slide well on any surface due to its consistency, so the topsoil must be transported in the buckets down the chutes. This process is very labor intensive, and only works when access is available to the slope from the top of the slope, and the hillside is such that the chutes can be placed on the slopes and maneuvered as needed into particular areas for soil application across the hillside. Buildings, roads, or inaccessible areas on the top of the slope hamper the laying of the chutes, so the buckets are manually transported down the hillside without the benefit of a chute.

Bark, compost mulch, hydroseeding and pea gravel are all items that in the past have been used to cover existing topsoil or as a substitute for topsoil in inaccessible places. Each of these items do not provide the benefits of topsoil for stability and vegetation growth, and they retain many of the same disadvantages with respect to access to and application on hillsides, as discussed above. Importantly, these materials do not provide stabilization of the slope in the way that topsoil does. Bark and compost mulch are used as a cover mulch over an existing planted area. Hydroseeding is a process of spraying a liquid (e.g., water) and seed mixture over the top of existing soil. The hydroseed mixture is a binding mix to hold the seeds in position on the existing topsoil until they germinate. Pea gravel is used on slopes and in other areas to address drainage concerns.

A conveyor belt system has also been used to place soil in difficult places. The conveyor belt system, however, provides relatively imprecise placement of soil, and the system is not practicably useable in areas containing trees and densely planted shrubs without causing damage to these plants. Further, relocating the conveyor belt system to dispense the soil from the top, bottom or sides is time consuming and labor intensive.

SUMMARY OF THE INVENTION

The present invention overcomes the limitations of the prior art and provides additional benefits. Under one aspect of the invention, an improved soil mixture capable of being placed on a surface, including sloped surfaces either via traditional or selected placement means including placement by blowing the mixture into place. Under another aspect of the invention, this soil mixture is blown through a manipulatable distribution line onto the surface, including areas which may be substantially inaccessible.

Additional aspects of the invention include combining a selected aerobic compost tea with the soil distribution operations such that the tea is distributed and intermixed with the soil as the soil is blown into place. Under another aspect of the invention, sand, rich in potassium and trace minerals of prehistoric origin is distributed over the surface prior to blowing the soil in place and the soil is then distributed over the layer of greensand. Under another aspect of this invention, fired/calcined diatomaceous earth is added or substituted in the mixture to decrease initial surface moisture content but increase moisture retention capabilities. Under another aspect of this invention, dry mycorrhizal spores are added to speed the natural production of fungi. Under another aspect of this invention, a powdered or granulated corn glutin is added to prevent the growth of undesirable plants.

In another aspect, the present invention is directed to a soil distribution system adapted for blowing a soil mixture onto selected places on flat or sloped surfaces. The soil distribution system comprises a topsoil pump having first and second ends; a hopper connected to the pump at the first end; a first topsoil hose having a distribution end and a soil intake end, the first topsoil hose being connected to the second end of the pump via the soil intake end; a tank for holding a liquid soil mixture additive, the tank having an outlet portal; a second liquid additive hose having a discharge end and a liquid intake end, the second liquid additive hose being connected to the outlet portal of the tank via the liquid intake end; wherein the distribution end of the first topsoil hose and the discharge end of the second liquid additive hose are in operational relationship with each other such that when the soil distribution system is in operation, the soil mixture and the liquid additive are capable of intermixing during the blowing of the soil mixture.

In another aspect, the present invention is directed to a soil mixture adapted for use with a soil distribution system that is capable of blowing the soil mixture onto selected places associated with flat or sloped surfaces. The soil mixture comprises an organic fertilizer component that consists essentially of plant residues and a first animal excrement component, wherein the amount of the organic fertilizer component ranges from about 1 to 3 pounds per cubic yard of the soil mixture; a feathermeal component that consists essentially of ground poultry feathers, wherein the amount of the feathermeal component ranges from about 4 to 8 pounds per cubic yard of the soil mixture; an aggregate component that includes gravel, wherein the amount of the aggregate component ranges from about 1200 to 1600 pounds per cubic yard of the soil mixture; a composted organic material component that consists essentially of sawdust and a second animal excrement component, wherein the composted organic material component includes a plurality of discrete particles with each of the plurality of particles having a length of less than ⅝ of an inch, and wherein the amount of the composted organic material component ranges from about 200 to 700 pounds per cubic yard of the soil mixture; an organic waste component that is at least about 35% humic acid by weight, wherein the amount of the organic waste component ranges from about 20 to 30 pounds of the soil mixture; a kelp meal component that consists essentially of ground kelp, wherein the amount of the kelp meal component ranges from about 2 to 4 pounds per cubic yard of the soil mixture; a peat moss component in an amount that ranges from about 18 to 25 pounds per cubic yard of the soil mixture; a ground or granular rock phosphate component in an amount that ranges from about 0.5 to 3 pounds per cubic yard of the soil mixture; a sand component in an amount that ranges from about 100 to 700 pounds per cubic yard of the soil mixture; and a sawdust component in an amount ranging from about 155 to 300 pounds per cubic yard of the soil mixture.

In further embodiments, the soil mixture further has one or more of the following characteristics: the organic fertilizer component has a NPK rating (i.e., ratio of nitrogen to phosphorous to potassium on a molar basis) of about 6-4-4; the feathermeal component has a NPK rating of about 12-1-0; the sand component is greensand; the first and second animal excrements are the same or different. In still further embodiments, the soil mixture further comprises: a bloodmeal component in an amount that ranges up to about 3 pounds per cubic yard of the soil mixture (optionally the blood meal component has a NPK rating of about 13-1-0); a diatomaceous earth component in an amount ranging up to about 500 pounds per cubic yard of the soil mixture; a corn gluten component in an amount ranging up to about 8 pounds per cubic yard of the soil mixture; a plurality of mycorrihiza spores; lime in an amount ranging up to about 3 pounds per cubic yard of the soil mixture; an aerobic compost tea in an amount ranging up to about 5 gallons per cubic yard of the soil mixture; and a plurality of earthworms.

BRIEF DESCRIPTION OF THE DRAWINGS

In the drawings, like reference numbers identify similar elements or steps. For ease in identifying the discussion of any particular element, the most significant digit in a reference number refers to the figure number in which that element is first introduced (e.g., element 204 is first introduced and discussed with respect to FIG. 2).

FIG. 5 is a schematic flow chart of a start-up procedure for one embodiment of the soil blowing operation.

FIG. 6 is a schematic flow chart of a shut-down procedure for one embodiment of the soil blowing operation.

Figure 1:
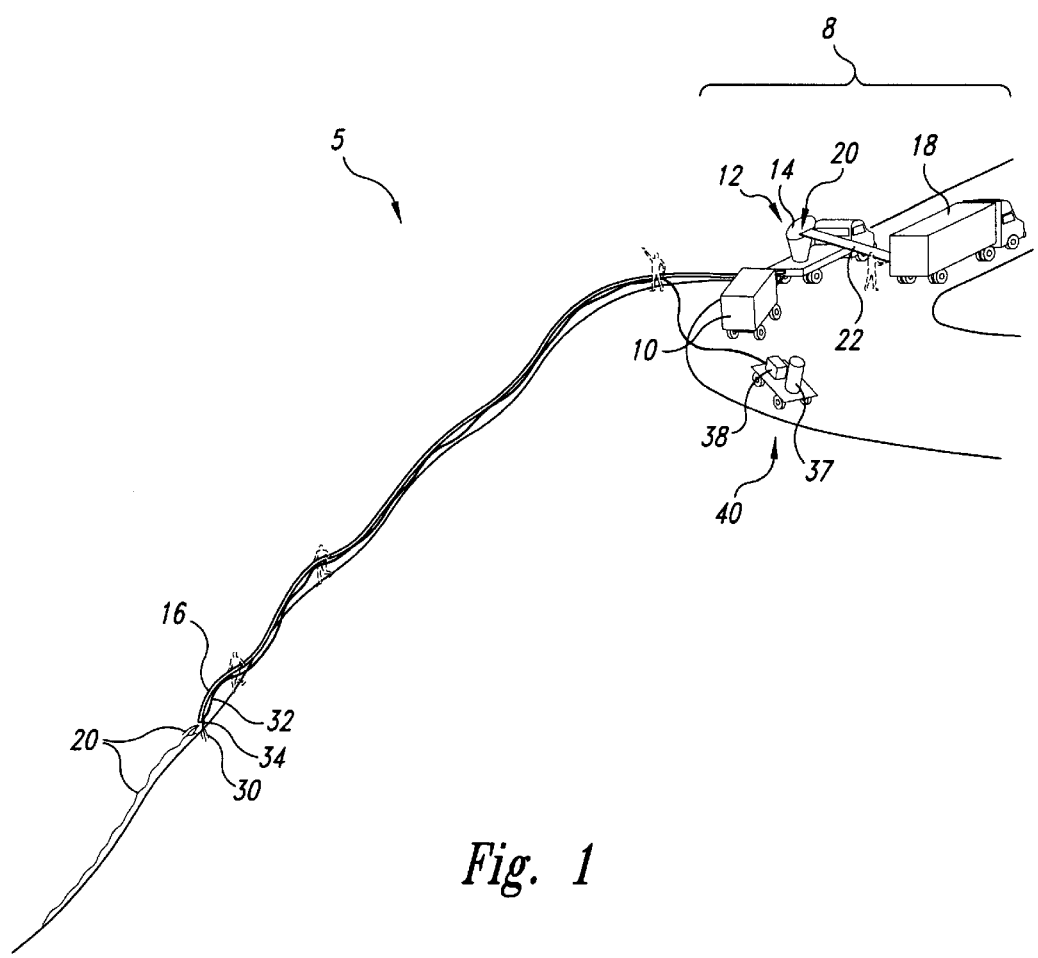
FIG. 1 is a schematic view of one embodiment of the invention showing a soil blowing operation on a hillside.

FIGS. B1–5 provide test data associated with Example 2.

DETAILED DESCRIPTION OF THE INVENTION

A soil distribution system and a soil mixture capable of being blown into place by the soil distribution system, in accordance with an embodiment of the present invention, are described herein with reference to the Figures. In the following description, numerous specific details are provided, such as pump characteristics, hose diameters, soil component variations, tea distribution method, etc., to provide a thorough understanding of embodiments of the invention. One skilled in the relevant art, however, will recognize that the invention can be practiced without one or more of the specific details, or with other equipment, methods, etc. In other instances, well-known structures or operations are not shown or not described in detail to avoid obscuring aspects of the invention.

The present invention is directed toward a soil placement system, and particularly directed toward a method of blowing topsoil, using an improved soil mixture and specialized equipment onto selected surfaces, such as a steep hillside. The soil placement system is effective for delivering soil to difficult-to-reach locations, such as locations substantially inaccessible using conventional soil-distributing techniques. This includes landslide areas, difficult-to-reach hillsides, vineyards, orchards, difficult-to-reach backyards and rooftop planters or container gardens, and wherever it has become cost-prohibitive or virtually impossible for topsoil to be applied, either with conventional equipment or manually.

The topsoil, in accordance with an embodiment, is a blend of materials that provide a lightweight, permeable, completely organic, and nutrient rich topsoil blend. This topsoil blend provides several advantages, including an increased ability to adhere to the subgrade, improved and balanced permeability, wholly organic, the ability to promote rapid root growth, and a cost-effective system of placement. The ingredients, the way in which it is mixed, stored, and utilized, makes blowing of this topsoil blend by this method possible.

The method of blowing the topsoil blend quickly and efficiently provides natural, nutrient-rich, highly permeable and viable topsoil directly to selected locations in a very cost-effective manner. By applying this topsoil blend on landslide areas, reforestation areas, and eroded hillsides, the process of replacing topsoil is significantly sped up as compared to the time required for topsoil to build up naturally. In selected embodiments, the topsoil blend is combined with an aerobic compost tea, such as Micro-Brewer Tea, U.S. patent application Ser. No. 08/772,279, as the topsoil is distributed. The above-mentioned U.S. patent application is hereby incorporated by reference. The aerobic compost tea works with the topsoil blend to promote healthy topsoil for vegetation growth.

The topsoil blend includes a mixture of ingredients to create a soil with a balanced permeability retaining enough moisture for the plant roots to thrive, while allowing all excess moisture to percolate through the soil naturally and therefore prevent erosion. Further, this topsoil blend is 100% organic. Organic soil provides the additional advantage of replicating nature. The addition of chemicals to a topsoil could kill micro-organisms, deaden soil fertility, and eliminate the balance that makes the topsoil capable of nourishing plant growth.

An illustrative embodiment of the topsoil blend includes a blended formula based on a 1 cubic yard quantity. This mixture includes: preferably zero to 3 pounds, more preferably 1 to 2.5 pounds, and most preferably 2 pounds of a quick release nitrogen source; preferably 1 to 3 pounds, more preferably 1.5 to 2.5 pounds, and most preferably 2 pounds of a general broadcast fertilizer; preferably zero to 5 pounds, more preferably 1 to 3 pounds, and most preferably 1.5 pounds of powdered limestone; preferably 4 to 8 pounds, more preferably 5 to 7 pounds, and most preferably 6 pounds of a slow release nitrogen source; preferably zero to 1600 pounds, more preferably 500 to 1300 pounds, and most preferably 1232 pounds of preferably ⅜", more preferably 5/16", most preferably ¼" minus aggregate; preferably 200 to 700 pounds, more preferably 300 to 500 pounds, and most preferably 418 pounds of preferably ¾" minus, more preferably ½" minus, and most preferably ¼" minus ground/composted organic material mixed with a composted organic waste product; preferably zero to 300 pounds, more preferably 100 to 200 pounds, and most preferably 155 pounds of preferably ¾" minus, more preferably ½∆ minus, and most preferably ¼" minus ground/uncomposted organic material; preferably 10 to 50 pounds, more preferably 20 to 30 pounds, and most preferably 26 pounds of organic waste comprised of 30% to 50% humic acids and 30% to 50% carbon; preferably zero to 5 pounds, more preferably 1 to 4 pounds, and most preferably 2.2 pounds of a trace mineral source containing 50 to 75 trace minerals; preferably zero to 3 pounds, more preferably 1 to 2.5 pounds, and most preferably 2 pounds of an acidic broadcast fertilizer; preferably 10 to 30 pounds, more preferably 18 to 25 pounds, and most preferably 22.3 pounds of dried/ground/compressed fiberous plant-based materials; preferably zero to 4 pounds, more preferably 0.5 to 3 pounds, and most preferably 2 pounds of powdered or granular phosphate; preferably zero to 700 pounds, more preferably 100 to 300 pounds, and most preferably 112 pounds of 1/16" minus silicate granules. Alternative embodiments include the addition or substitution of preferably zero to 500 pounds, more preferably 25 to 100 pounds, and most preferably 50 pounds of fired/calcined diatomaceous earth; preferably zero to 50 pounds, more preferably 10 to 30 pounds, and most preferably 20 pounds of sand, rich in potassium and trace minerals; zero to 20 pounds, more preferably 5 to 15 pounds, and most preferably 10 pounds of dry mycorrhizal spores; preferably zero to 10 pounds, more preferably 3 to 8 pounds, and most preferably 5 pounds of granulated or powdered corn-gluten; preferably 1 to 5 gallons, more preferably 2 to 4 gallons, and most preferably 3 gallons of aerobic microbial liquid compost extract; preferably zero to 500, more preferably 100 to 400, and most preferably 250 individual epigeic, endogeic, and anecic earthworms Rock phosphate is a natural mined mineral ground into a fine powder and granulated for ease of spreading. Total phosphorous content is approximately 27%, calcium 24% and magnesium 29%, and the rock phosphate contains 11 trace minerals. Bloodmeal is an example of a quick-release nitrogen fertilizer that promotes rapid growth and high yields in addition to promoting stem and leaf growth. Feather meal is an example of a slow-release nitrogen source that promotes stem and leaf growth. Kelp meal is an example of a trace mineral source made from dried and ground kelp, more specifically, *Ascophyllum Nodosum*, that grows in the cold waters of the North Atlantic off the coast of Norway, Iceland and Nova Scotia. *Ascophyllum Nodosum* has one of the richest, most complete and balanced array of trace minerals known. The kelp plant extracts at least 68 minerals from the sea in a precise and balanced portion. Kelp meal contains potassium, vitamins, amino acids and natural growth promoting hormones. Kelp meal helps the friability of the soil and stimulates the beneficial organisms in the soil.

Complete organic fertilizer is an example of a general broadcast fertilizer that includes blood meal, feather meal, steamed bone meal, kelp meal, langeinite, and dolomite lime. This mixture of soluble nutrients give plants a fast start, and slow release nutrients to keep them growing. Organobloom organic fertilizer is an example of an acidic broadcast fertilizer that includes feather meal, cottonseed meal, bone meal, langeinite, kelp meal, and greensand. This mixture of natural nutrients and trace minerals provides an excellent balance for growth of plants with an affinity for acid. Peat moss is a natural product that adds a certain acidity to the soil and helps keep the topsoil blend sufficiently dry until it is blown onto the selected surface. Menefee humate is an example of an organic waste product high in humic acids and carbon. It is used to promote general soil health; to hold, through anion and cadion exchanges, nutrients for plant growth; to promote good soil tilth; and to increase soil organic matter (humus), microbial activity, and microbial count.

Aggregates add to the mix increased permeability of the topsoil, blowability (e.g., the ability of the topsoil to feed through the hopper and the hose) of the topsoil, and the solid matter to which the addition of decomposing organic matter makes it into soil, thus duplicating nature's process. An example of aggregate material may be any one of the following, or any combination of the following: granulithic with sand, clean granulithic, or ¼" pea gravel with sand. The granulithic with sand is a product with course sand already mixed in. The clean granulithic is a product that requires coarse sand to be added. The approximate ratio of clean granulithic material to sand is 8–9 cubic yards of clean granulithic material to 3–4 cubic yards of coarse sand. The ¼" pea gravel is a product that requires sand to be added. The approximate ratio of ¼" pea gravel to coarse sand is 7–8 cubic yards of pea gravel to 4–5 cubic yards of coarse sand.

Groco mulch is an example of a ground/composted organic material mixed with an organic waste product. It adds organic matter to the soil. Alternatively, dried fine compost may be used in place of groco mulch, or in combination with the groco mulch, such as in an approximate ratio of half groco mulch and half dried fine compost. The dried fine compost has a preferable maximum particle length of less than approximately ⅝", and more preferably has a maximum particle length of less than approximately ¼".

Greensand is an example of a sand rich in potassium and trace minerals. It has a unique tilth-enhancing property and performs like humus in the soil, unbinding heavy clay soil and increasing the moisture retention of sandy soil. Greensand builds long-term fertility and improves the soil caution exchange capacity and physical structure. Because of the greensand's ability to break up clay particles, the greensand acts as a bonding agent between the new blown topsoil and existing hard clay or other layers on the surface receiving the topsoil. The greensand, thus, gives plant roots the possibility of penetrating the sublayers of soil. The greensand may be added to the topsoil blend or may be applied directly to the existing subgrade prior to placing the topsoil. The amount of greensand varies dependent both on the density of the existing soil and on the anticipated thickness of the topsoil layer to be applied.

The topsoil blend of this illustrative embodiment retains a sufficient amount of water to promote rapid growth of the root systems. The effect of fast and expansive root growth in the topsoil is that stability of the hillsides is increased by the plant materials. The fast root growth within the soil creates extensive root systems. These root systems help prevent against trees or shrubs uprooting in heavy winds. Extensive root systems means good plant stability which in turn creates good ground stability.

Another advantage of this topsoil blend is its ability to resist the impact of rain due to the aggregates. In a relatively short period of time some of the gravel becomes exposed on the surface of the soil. When hit by rain, the exposed gravel diffuses the velocity of the raindrops and therefore prevents the micro-impact of little craters that cause erosion.

In alternative embodiments, the ingredients of the topsoil blend are varied depending on the needs for the particular plants, or location of the application of the topsoil blend. The illustrated topsoil blend described above provides a blend of ingredients that meet the needs of the local plants or vegetation. The topsoil blend, however, can be adapted to provide a blend of ingredients for use in any region using available materials to meet the needs of the local vegetation without deviating from and still adhering to the basic formula's characteristics.

The topsoil blend has a very low moisture content to start with that allows the topsoil to be blown with air through the hoses more effectively. Preferably the moisture content of the topsoil blend during the blowing operation is less than 30% relative moisture content, more preferably the relative moisture content is less than 20%, and most preferably the relative moisture content is less than 15%. The topsoil's ingredients are in a relatively dry condition when mixed together, and some of the ingredients, such as dried/ground/ compressed fiberous plant-based materials and fired/ calcined diatomaceous earth, help to further dry out the completed mixture.

The actual process of mixing the topsoil may be done by a front-end loader at a batch plant. The front-end loader has the capability of laying the topsoil out to dry to a selected moisture content, which will then allow it to be put in the hopper and blown into place on site. Spreading out the mixture to dry is done in as thin a layer as possible depending on the space available. The topsoil blend may be dried by the sun or alternatively it may be mechanically dried to reduce the moisture content. After drying the topsoil mixture, it may be loaded into trucks and transported to the site. Moisture will be added to the topsoil blend by rainwater, irrigation water, or an aerobic compost tea application as the topsoil is blown into place.

Figure 2:
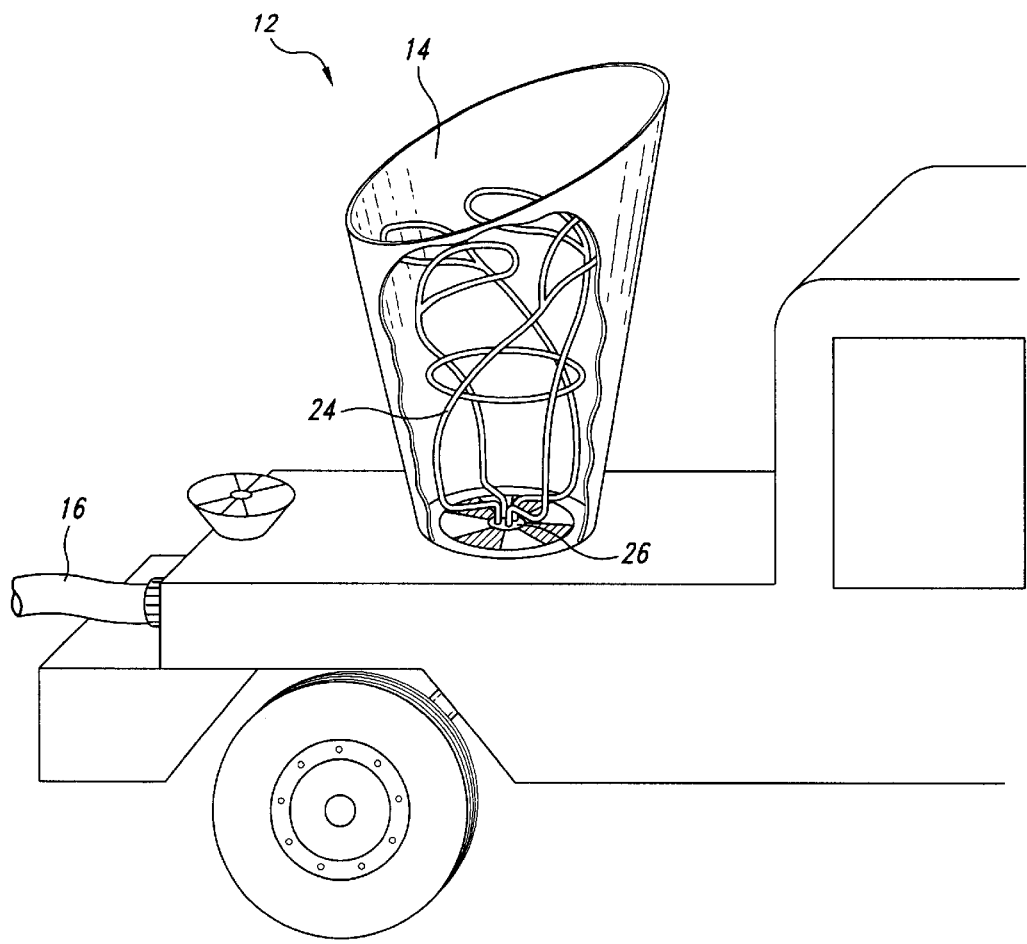
FIG. 2 is an enlarged isometric view of a modified agitator (shown in hidden lines) and a hopper used in the soil blowing operation of FIG. 1.
Figure 3:
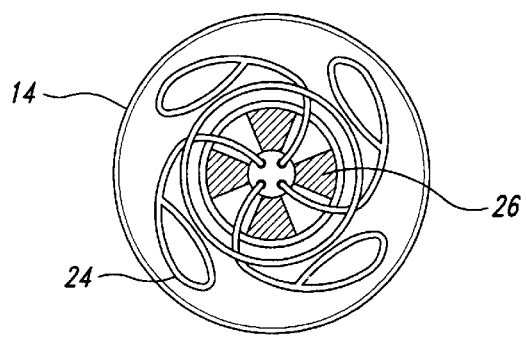
FIG. 3 is a plan view of the hopper and the agitator of FIG. 2.

FIG. 1 illustrates a schematic overview for one application of the present invention. The soil distribution system 8 includes a combination of several pieces of equipment, including a generator 10, a pump 12, a hopper 14 connected to the pump, a topsoil hose 16 connected to the hopper and the pump, and a conveyor belt truck 18 having a conveyor belt 22 that delivers the selected topsoil blend to the hopper. The topsoil blend 20 is trucked to the site 5 and loaded on the conveyor belt 22. The conveyor belt 22 loads the topsoil blend 20 into the specially adapted hopper 14 in a controlled and even manner. As best seen in FIGS. 2 and 3, the hopper 14 contains an enlarged, rotating agitator 24 that stirs the topsoil blend 20 to prevent clogging as the hopper 14 funnels the topsoil blend 20 through the pump 12 and into the hose 16. The pump 12 of this embodiment is a gunite pump, although other pumps can be used to move the topsoil blend from the hopper 14 and through the hose 16 at a desired velocity and volume. The hose 16 length of the illustrated embodiment is approximately 450 feet, although shorter or longer hose lengths could be used.

The pump 12 pumps the dry topsoil blend 20 through the hose 16 to an open free end of the hose positioned on the slope onto which the topsoil is being blown. As the dry topsoil blend 20 is blown through the hose 16 and out the open free end, a worker on the slope directs the hose's free end to spray the topsoil blend onto the desired areas of the slope. The worker thus controls the hose and can, as an example, specifically direct the topsoil blend to hard-to-reach areas on the slope.

Figure 4:
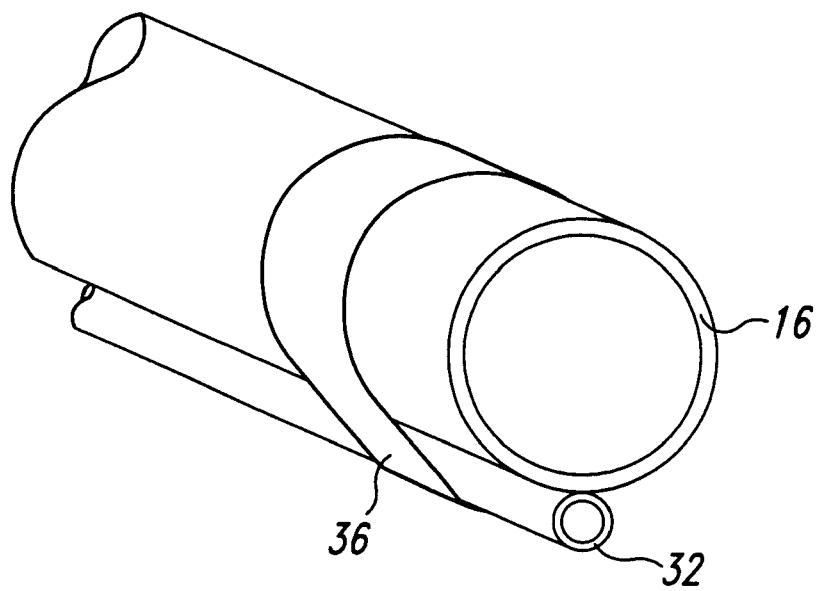
FIG. 4 is an enlarged isometric view of hoses used in the soil blowing operation of FIG. 1 for conveying the soil and an aerobic compost tea through the open end of the hoses.
Figure 7:
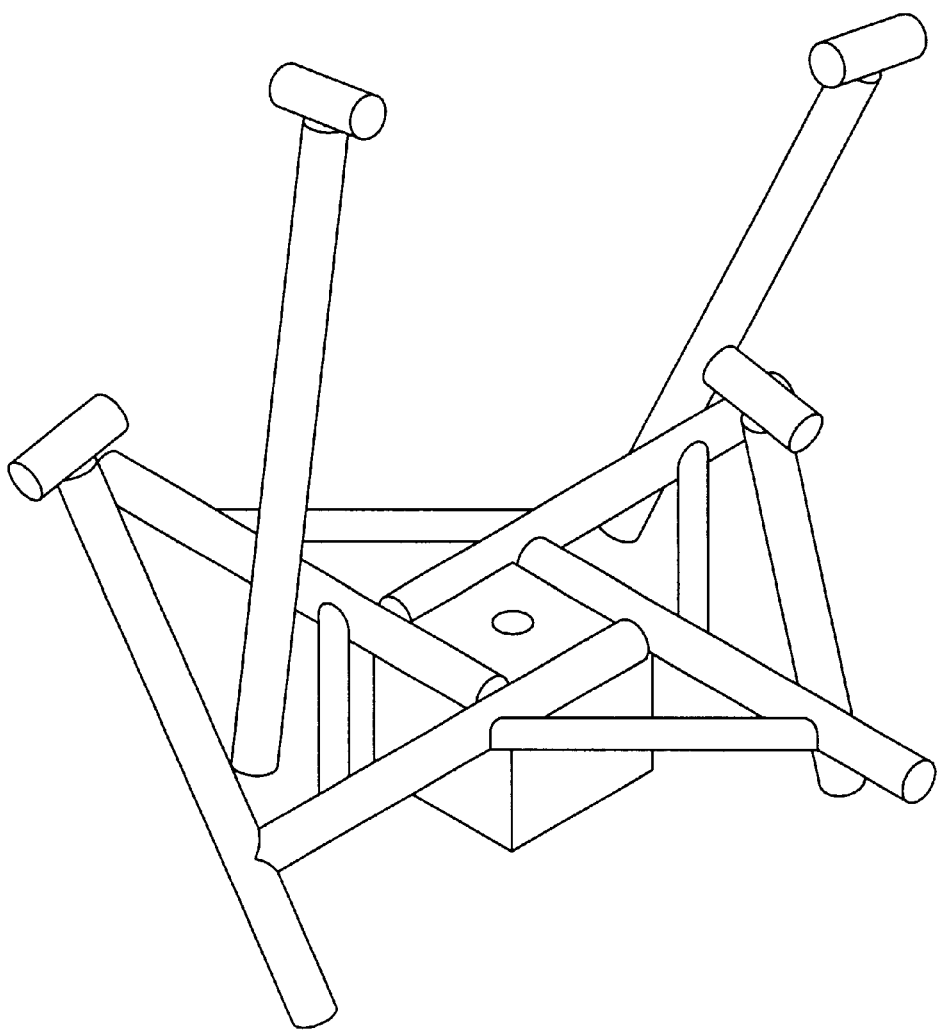
FIG. 7 is an isometric view of an agitator in accordance with an embodiment of the present invention.
Figure 8:
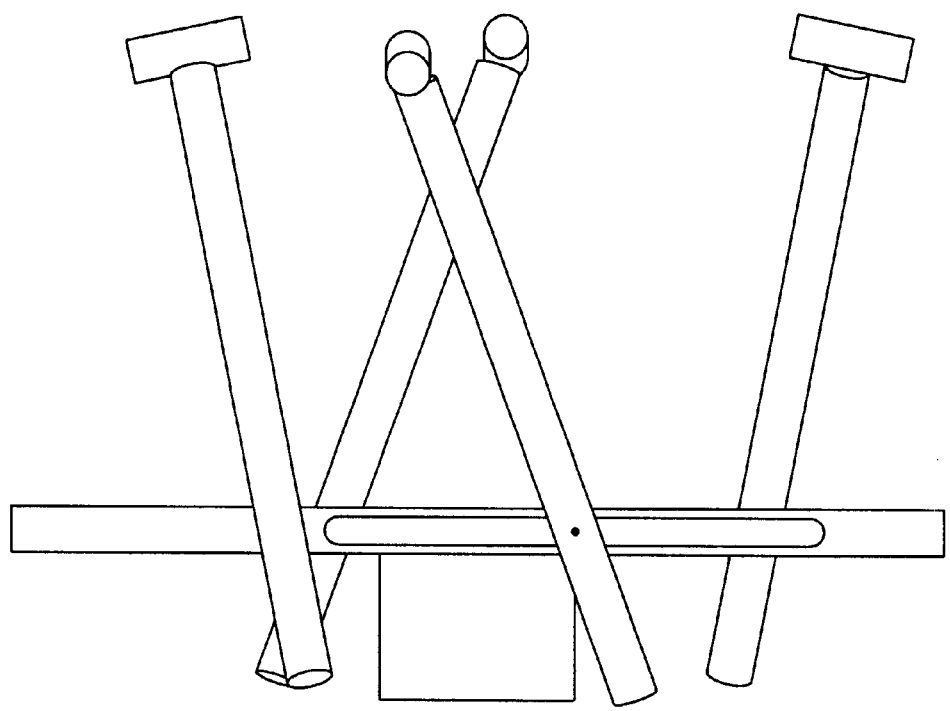
FIG. 8 is a front view (showing various dimensions) of the agitator depicted in FIG. 7.
Figure 9:
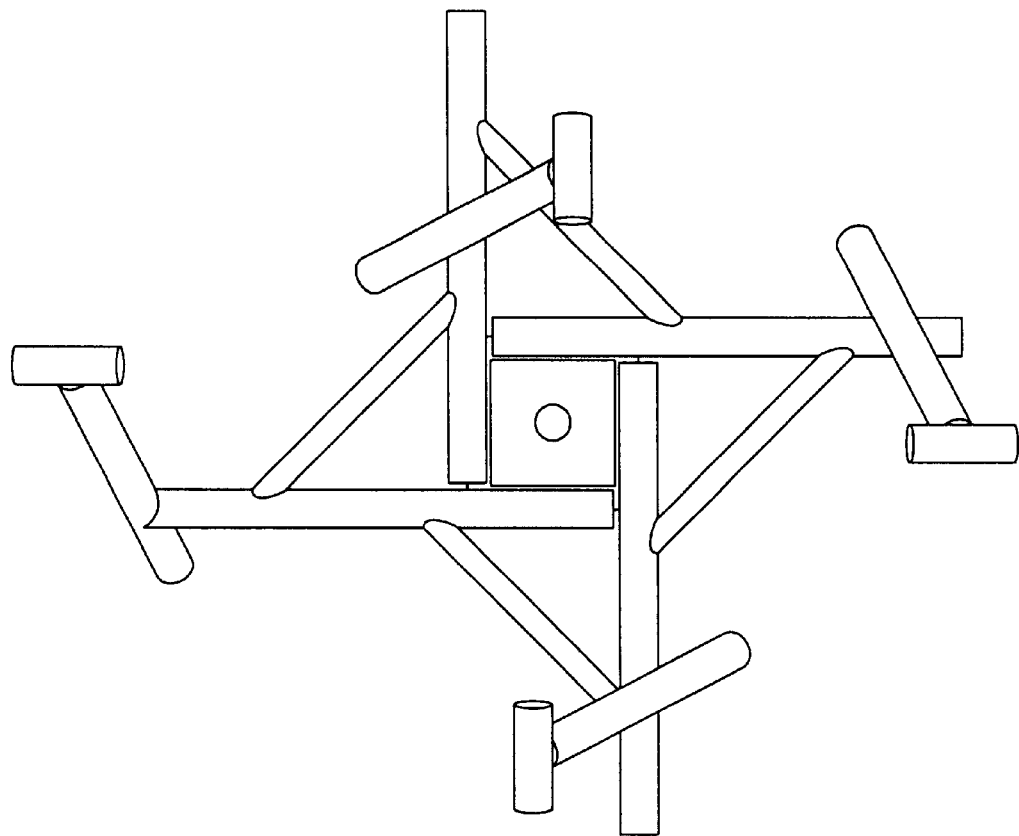
FIG. 9 is a top view (showing various dimensions) of the agitator depicted in FIG. 7.
Figure 10:
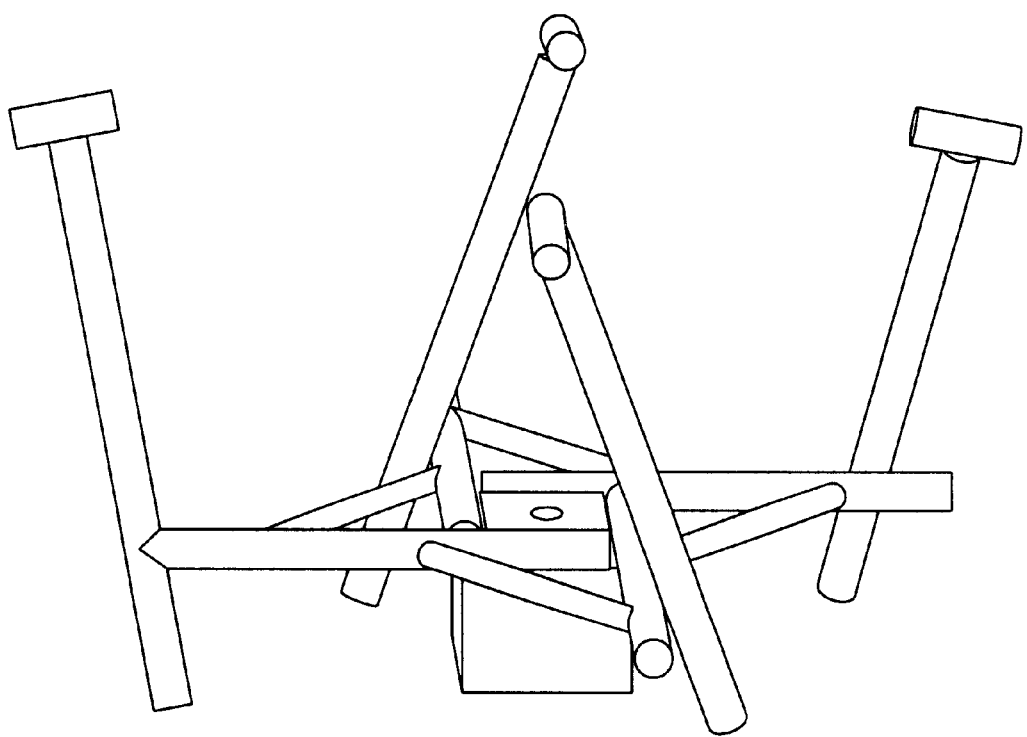
FIG. 10 is a normal to outside tine view (showing various dimensions) of the agitator depicted in FIG. 7.
Figure 11:
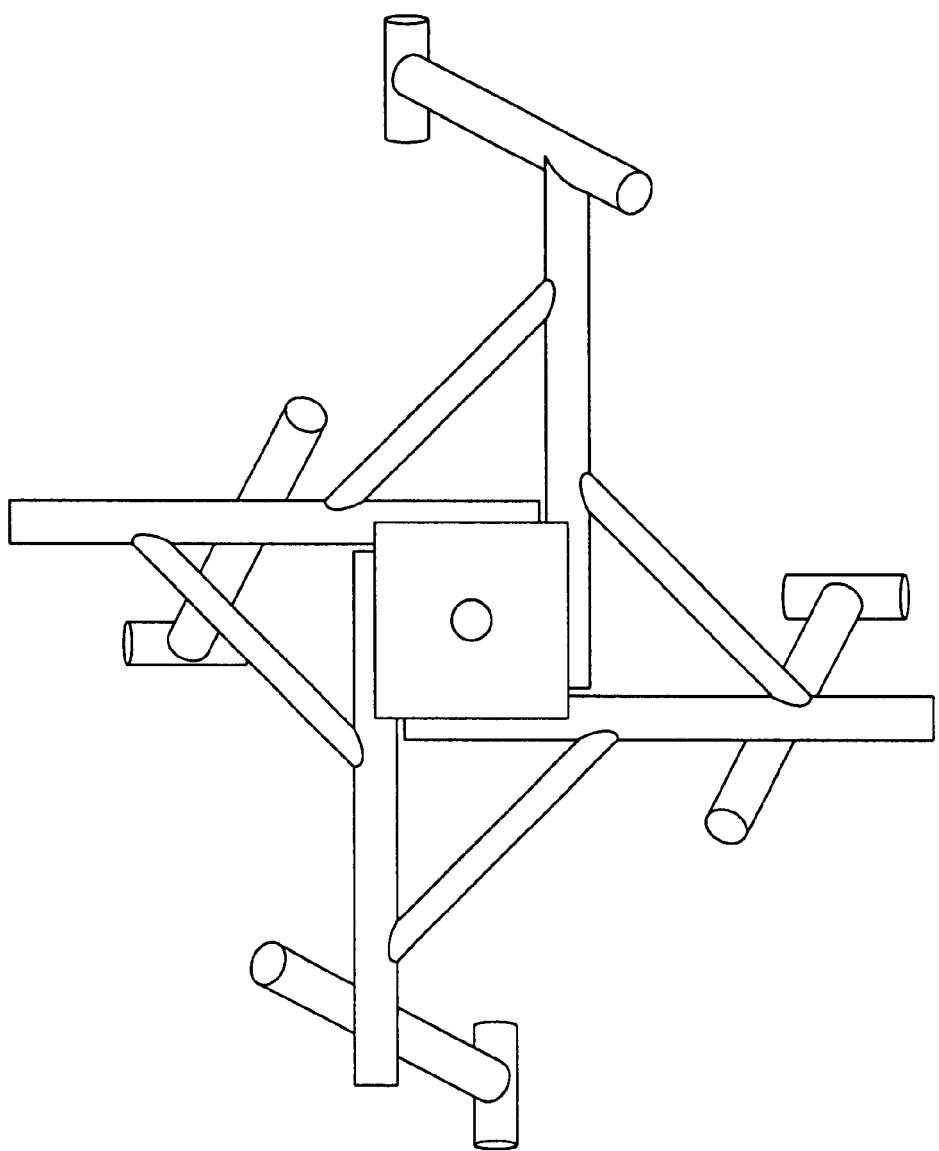
FIG. 11 is a bottom view (showing various dimensions) of the agitator depicted in FIG. 7.
Figure 12:
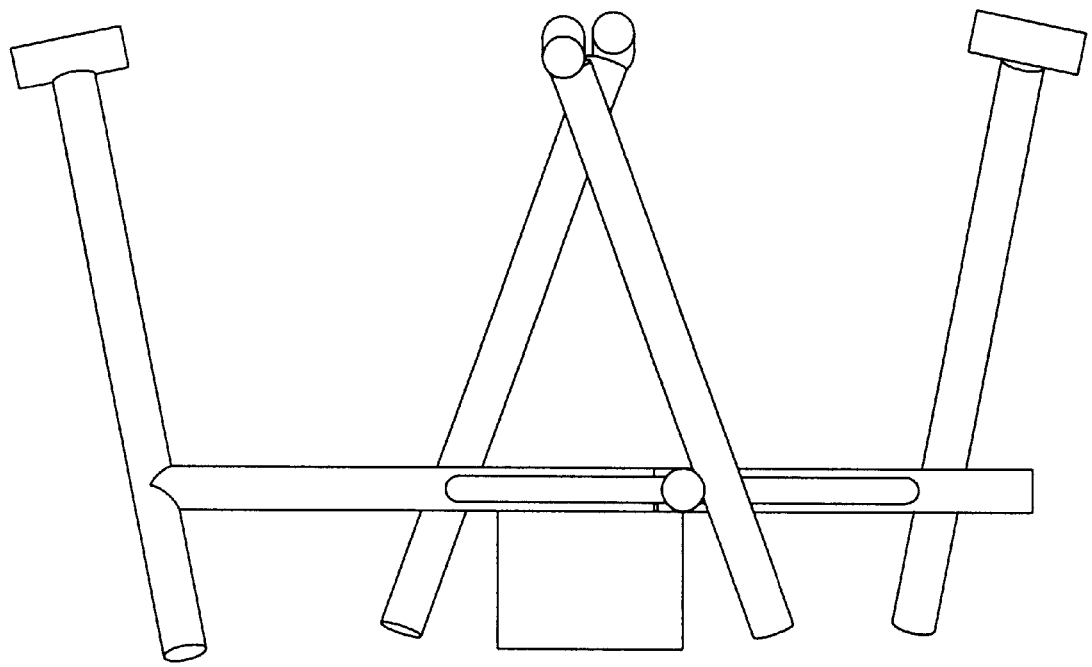
FIG. 12 is a right side view of the agitator depicted in FIG. 7.

In one embodiment, the topsoil blend 20 is sprayed through the hose 16 and is combined at the hose's open free end with a liquid aerobic compost tea 30. The compost tea 30 is sprayed simultaneously through a smaller hose 32 coupled to the other topsoil hose and out of a separate nozzle 34 secured adjacent to the free end of the topsoil hose 16 (see FIG. 4). As shown in FIG. 4, the two hoses 16, 32 may be secured together with duct tape 36 or equivalent means so both hoses 16, 32 move together around the hillside during a spraying operation. In this illustrated embodiment, the topsoil blend 20 and the compost tea 30 intermix in the air during the blowing operation and are spread simultaneously. Thus, at the point the topsoil blend 20 hits the ground it not only already has moisture in it via the compost tea, but also has the micro-organisms from the compost tea in it to start activating the soil.

The aerobic compost tea spray is intermixed with the blown topsoil as the soil exits the hose and before it lands in place. The tea spray has a nozzle that the hose operator can use to control the application rate of the aerobic compost tea. The tea spray nozzle has a locking mechanism that allows it to be on constantly. The tea spray nozzle is attached so that it is at an angle relative to the topsoil hose, so the compost tea sprays into the flow of topsoil blend and they are combining in mid air before landing in place. By intermixing the tea spray with the topsoil blend as they exit their respective hoses, the micro-organisms are able to begin immediate multiplication.

As best seen in FIG. 1, the aerobic compost tea 30 is distributed from a separate spray unit 40, has a separate tank 37, a pump 38, the hose 32, a trigger, and the nozzle 34. The tank 37 of the spray unit 40 can vary in size, as an example, from 50 gallons to up to 500 gallons. The tank 37 may be mounted on a trailer (as shown in FIG. 1), mounted on a truck, or may be a stand-alone tank delivered to the site.

In an alternative embodiment, greensand may be used as a precursor to the blown topsoil, or as an addition to the mix. Greensand is a natural mined mineral composite that breaks up clay particles and helps create a bond between the existing soil and the new topsoil mix that is blown onto it. In another alternative embodiment, earthworms are added to the topsoil after it is blown or otherwise transported onto the slope or other selected location. The earthworms promote permeability-of the soil.

In still another alternative embodiment, a blowing truck may be used to distribute the topsoil blend 20 and the compost tea 30 if used. This equipment would allow the topsoil blend to be pumped to and blown in place in a wide range of areas, such as rooftop gardens, over the top of obstructions, or across ravines.

The blown topsoil blend 20 is adapted to be used on very steep slopes without netting. After the topsoil blend is blown into place, the topsoil is capable of receiving tremendous amounts of precipitation substantially without showing signs of erosion. The topsoil blend 20 is able to hold enough moisture for plant growth, while allowing excess moisture to percolate out of the soil and drain naturally on the ground surface.

The topsoil blend 20 as illustrated is a totally organic mixture that enhances the environment, supports healthy plant growth, and does not leach chemical substances into groundwater, lakes, or farmyards. The topsoil blend 20 can be placed onto difficult-to-reach hillsides, landslides, backyards, vineyards, orchards, and the like, or where it is cost-prohibitive to otherwise place topsoil using conventional techniques. The method of blowing the topsoil blend 20 and intermixing the aerobic compost tea 30 simultaneously provides the additional advantages as described above of cost efficiency and effectiveness. The topsoil blend 20 has been used on severe landslide restoration projects in a cost-efficient manner.

An example of an application of the process described above was conducted in the Pacific Northwest of the United States as follows. A landslide on a 1 to 1.17 slope removed substantially all permeable topsoil and vegetation leaving exposed a hard, virtually impermeable clay layer. Native plants remaining around the perimeter of the slide area included maples, alder, blackberries and sword ferns. The landslide on this property was narrower at the top of the bank, approximately 35 feet wide, and grew to approximately 120 feet wide at the bottom. The area of slope restoration area receiving the blown topsoil blend 20 was approximately 7,500 square feet.

The process included clearing the hillside of unwanted debris, such as brush and blocks of loose clay. The hard clay was treated with a layer of greensand to break down the clay particles so as to promote a bond between the topsoil blend 20 and the slope, and to allow root penetration into the sublayers of soil. Spreading of the greensand was done by hand using buckets. A system of scaffolding planks and ramping was set up for access to the slide area, and this system was used to spread the greensand. The greensand was applied at a rate of 5 to 10 pounds per square foot. After this, the slope was ready to receive the blown topsoil blend.

The specialized topsoil blend 20 as described above was mixed offsite and dried to an appropriate moisture content. Conveyor belt trucks 14 picked up the topsoil blend 20 from the offsite mixing location and delivered it to the site. Each conveyor belt truck 14 loads the topsoil blend 20 into the hopper 14 in a controlled manner. The operator maneuvered the conveyor belt 22 by remote control, which permitted flexibility and allowed for optimum positioning of the conveyor belt 22 with respect to the hopper 14.

The conveyor belt truck can haul up to 10 to 12 yards of the topsoil blend in one load, therefore, three trucks were used to maintain a constant flow of the topsoil blend to the hopper. The number of conveyor belt trucks used varies depending on the distance between the site and the offsite batch plant, and the application rate of the topsoil blend.

The pump equipment used to blow the topsoil blend on this slide restoration project was a gunite pump, Jet-Creter, Model 450. As shown in FIGS. 2 and 3, the hopper 14 was specially adapted by installing a larger agitator 24 designed to improve soil flow into a blow chamber by increasing the agitation motion which reduced soil clogging. This agitator 24 is a longer-armed agitator 24 that reaches out from the centrifugal core 26 and goes up the sides of the hopper 14 to within approximately 6 inches of the top of the hopper 14. Half inch diameter reinforcing steel was used to form the arms of the agitator 24.

The rate of topsoil blend 20 conveyed into the hopper 14 is adjusted as a function of the intake of the topsoil blend 20 from the hopper 14 into the rotor chamber. The rotor chamber will clog if the rate of topsoil 20 into the hopper 14 is too fast, therefore, the input into the hopper 14 should match the output rate. A gunite pump works on the principle of air stream conveyance. The dry topsoil blend 20 is transported from the hopper 14 through a rotor chamber's topsoil hose into the air chamber and from there it is pushed through the topsoil hose 16. With the help of an adjustable compressed air stream, the topsoil blend 20 is transported through a topsoil hose 16 and sprayed out the open free end.

The topsoil blend's moisture content is kept below a selected value, such as approximately 30%, to allow the topsoil blend 20 to flow through the topsoil hose 16. Therefore, the topsoil can be effected by the amount of moisture in the air. So, if it rains during the spraying operation, a protective cover may be needed over the conveyor belt 22 and the hopper 14 in order to control moisture content in the topsoil blend 20. The conveyor truck may also have a cover on it to protect the topsoil blend 20 from unwanted additional moisture.

FIG. 5 is a schematic flow chart of the start-up procedure used for this operation. The equipment was checked prior to the topsoil blend being added to the hopper to make sure it was functioning properly. Once the equipment was functioning, soil was conveyed into the hopper, rotated through the hopper by the agitator and blown through the hose into place.

In this example, the topsoil blend was blown through a 3½ inch outside diameter (OD), 2½ inch inside diameter (ID), reinforced rubber flexible hose 16, similar to that used for shotcrete or concrete pumping, but with no nozzle at the end. The topsoil hose 16 is open ended so that no restriction impedes the flow of the topsoil blend 20. The rate of application of the topsoil blend 20 averaged 4.5 cubic yards per hour. This rate of application controls the rate of soil conveyed into the hopper 14. The topsoil blend 20 is pumped through the hose 16 at a sufficient pressure so the topsoil blend 20 will shoot approximately an additional 25 feet from the hose's free end, depending on the angle of the hose 16.

The support staff required for a topsoil dispensing project will vary depending on the site conditions. In this exemplary operation at the slide location, one person was positioned at the conveyor truck controlling the topsoil fed into the hopper 14. One person was at the hopper 14 controlling air pressure and the hopper. Two people were positioned on the slope to control the hose's free end. Headphones with microphones were used for communication between the people on the work site. In another embodiment, another person would be needed to signal the hopper and conveyor operators. This individual would stand at the top of the slope, overseeing the application and communicating with the hose operator via a hand-held radio or headphones. This person signals the hopper and conveyor operator and the hose operator, acting as a communication liaison between the two.

The topsoil hose was coupled together onsite, and two people descended the hillside to couple together the sections of hose. The hose was in 10 foot to 20 foot sections. The sections of hose are lowered down the slope from the top of the slope using one or more ropes. The ropes may stay on individual hose sections if desired, for example, depending on the severity of the slope, the length of the run, etc. The ropes also serve to retrieve the hose when the spraying operation is complete. The ropes may also be used to support the hose on the hillside when the weight of the topsoil makes it difficult to maneuver the hose.

Operation of the topsoil hose 16 included two operators; one at the open free end, and a second approximately 8 to 10 feet up the hose from the free end. This second operator helped to steady the topsoil hose during the blowing procedure and to help relieve tension from the hose so that the main hose operator at the free end could move around freely to direct the flow of the topsoil blend. If bucking in the hose occurs during the blowing process, and this second operator can also assist in controlling the hose motion during application. The main operator held the hose under control at all times, for example, by slinging it either over a shoulder covered with a shoulder pad, or held against the side of the body with a sling.

In areas of existing vegetation, defense boards, such as sections of ¼" plywood, may be used to protect the vegetation on the slope. These boards also keep the topsoil blend out of unwanted areas, control overspray, and allow the topsoil blend to be blown right up to the edge of the area to be protected.

Application of the topsoil blend on the site covered approximately 7,500 square feet at a rate of approximately 4.5 cubic yards per hour. A total of 160 cubic yards of topsoil blend was applied at a depth ranging from approximately 4 to 12 inches, depending on the area and needs of the slope. Areas supporting particular plants, in this case, dwarf bamboo, needed only approximately 3 to 4 inches of the topsoil blend. Other planting areas, in this case, vine maples, rhododendrons and ferns, needed a depth of approximately 6 to 12 inches of the topsoil blend. For areas in which larger trees were to be planted, pocket areas were given up to 4 feet of topsoil blend in order to accommodate the large root balls. Application of the topsoil blend 20 through the hose allows precision placement of soil in substantially any area in order to meet the needs of the particular slope or site requirements. This illustrative project took a total of approximately 35 hours of blowing over a period of 4 days, including initial setup and final breakdown of equipment. FIG. 6 is a schematic flow chart of the shut-down procedure used in this example of a soil blowing operation.

After the topsoil blend 20 is distributed over the selected area, vegetation can immediately start to grow to increase the stability of the area. The topsoil blend 20 allows root growth that can be anywhere from 3 to 6 times faster than in the majority of other man-made topsoils. This is exceptionally important when dealing with landslide restoration. On the particular site described in the above example, plants were installed very late in the year and had little chance for deep root development before the dormant winter season. Stabilization of the slope during the rainy winter months thus was predominantly maintained by the action of the topsoil blend itself. The dormant winter season included a significant amount of rain. During this heavy rainfall, the topsoil blend remained stable, and no substantial cracking or settling was observed. Drainage was natural and the hillside was not stressed.

This result was not unexpected, because the stability of the topsoil blend on the steep slope was tested before completion of the project. The testing included spraying a 10 foot by 10 foot area of the topsoil blend (with no vegetation) with water, at a rate of 35 gallons per minute for over one minute. This is equivalent to one-half inch of rainfall in one minute. There was no substantive damage to the topsoil blend on the slope. Some of the water was absorbed by the topsoil blend, and the excess water within the topsoil blend drained out in a natural manner. The topsoil blend on the slope remained stable, and showed no signs of cracks or settling.

For purposes of illustration and not limitation, the following Examples more specifically disclose various aspects of the present invention.

EXAMPLE 1

Several samples of various soil mixture in accordance with the present invention were analyzed. The analysis included assessment of total and active bacteria, total and active fungi, flagellates, ciliates and amoebae (the three groups of the protozoa) and nematodes identified to genus and usually species if possible). Mycorrhizal fungi were assessed as well (to the extent that roots were included in the sample material).

In three specific samples tested, the blown soil mixture was found to contain excellent numbers of total (between 282 to 432 μg per gram dry weight of material) and active (26.6 to 38.4 μg per gram) bacteria. The material contained between 5.1 and 10.6 μg active fungal biomass per gram of material, and typically between 101 and 205 μg total fungal biomass per gram of material. Protozoan numbers were always outstanding, assuring high nutrient cycling and nutrient availability for plants grown in the material. Only beneficial nematodes were found in the blown soil mixture, which should prevent pest-nematodes from gaining a foothold in the soils to which this material is applied.

These organism numbers are precisely what grasses and annual plants require for best growth. Accordingly, it is believed that, quite low, if any, inorganic fertilizer additions would be required. With excellent soil health, plants can typically withstand most disease challenges.

Most landscaping materials do not contain significant amounts of beneficial life. In general, most landscaping materials contain disease-causing organisms or have been steam-treated or sterilized to reduce disease-causing organisms in the material instead of taking the approach of enhancing the beneficial life in the material. Lack of competitors, inhibitors or predators in landscape materials allows disease-causing organisms to gain the upper hand early in plant growth.

Specific test data is provided below in the following tables.

| | | | | | Organism Biomass Data | | | | | | |
|---|---|---|---|---|---|---|---|---|---|---|---|
| Sample # | Dry Weight of 1 gram Fresh Material | Active Bacterial Biomass (μg/g) | Total Bacterial Biomass (μg/g) | Active Fungal Biomass (μg/g) | Total Fungal Biomass (μg/g) | Hyphal Diameter (nm) | Protozoa Numbers/g | | | Total Nematode Numbers (#/g) | Percent Mycorrhizal Colonization of Root |
| | | | | | | | Flagellates | Amoebae | Ciliates | | |
| 80910 Medina Slope | 0.73 OK | 12.3 Great! | 277 Good! | 0.0 Low. Maybe dry in the recent past so no active? | 16 Low | 2.5 OK | NR | NR | NR | NR | NR |
| Desired Range | Field Capacity | 1.0–5.0 | 100–150 | 1.0–5.0 | 100–300 | (A) | 5,000+ | 5,000+ | 50–100 | 20–30 | 40%–80% |

(A) Hyphal diameter of 2.0 indicates mostly actinomyccic hyphae, 2.5 indicates community is mainly ascomycete, typical soil fungi for grasslands, diameters of 3.0 or higher indicate community is dominated by highly beneficial fungi, a Basidiomycete community. Season, soil moisture, soil type and organic matter level must be considered in determining optional foodweb structure. If sample information, such as pesticide use, fertilizer use, tillage irrigation, etc. are not included on the submission form, we assume local conditions based on client's address. One report is sent to the mailing address on the submission form. This is perplexing, given that the material is staying so well in-place on such a steep slope. The story seems to be in the bacteria, not the fungi. Good, sticky bacteria!

| | | | | Organism Ratios | | | | |
|---|---|---|---|---|---|---|---|---|
| Sample # | Total Fungal to Total Bacterial Biomass | Active to Total Fungal Biomass | Active to Total Bacterial Biomass | Active Fungal to Active Bacterial Biomass | Plant Available N Supply from Predators (lbs/ac) | Root-Feeding Nematode Presence | Leaf Organism Assay Percent Leaf Surface Covered by | |
| | | | | | | | Bacteria | Fungi |
| 80910 Medina slope | 0.06 Very bacterial which is good for | 0.00 No active detected | 0.04 OK | 0.00 OK | NA No active fungi detected | NA | NA | NA |

-continued

Organism Ratios

| Sample # | Total Fungal to Total Bacterial Biomass | Active to Total Fungal Biomass | Active to Total Bacterial Biomass | Active Fungal to Active Bacterial Biomass | Plant Available N Supply from Predators (lbs/ac) | Root-Feeding Nematode Presence | Leaf Organism Assay Percent Leaf Surface Covered by Bacteria | Fungi |
|---|---|---|---|---|---|---|---|---|
| Desired Range | annuals, but need fungi for perennials (1) | (2) | (2) | (3) | (4) | (5) | (6) | (6) |

(1) Brassica: 0.2–0.5; Row crops, Grass; 0.5–1.5; Berries, Shrubs, grape: 2–5; Deciduous Trees: 5–10; Conifer: 10–100
(2) Warm spring, early summer: 0.25+; Early spring, late winter and mid-summer: 0.10 to 0.15; Fall rain: 0.15 to 0.20; Drought/Frozen: 0.05 or lower. Values greater than appropriate for season means recovery from disturbance. Value lower means disturbance killed organisms and recovery is not occurring.
(3) Generally 1:1 results in good soil aggregate structure in crop soil; 2 to 5 for deciduous trees; 5 for conifers. Values above 1:1 mean soil pH may be decreasing, values less than 1:1 means pH increasing.
(4) Based on release of N from protozoan and nematode consumption of bacteria and fungi. Often protozoa and nematodes compete for food resources. When one is high, the other may be low. Also, if predator numbers are high, the prey may have low numbers.
(5) Idenfification to genus. For species identification of root-feeders, send samples to local parasitic nematology lab.
(6) While this assay is still being developed, we have found 70 to 80% coverage (sum of both bacterial and fungal coverage) reduces disease significantly.

Organism Biomass Data

| Sample # | Dry Weight of 1 gram Fresh Material | Active Bacterial Biomass (μg/g) | Total Bacterial Biomass (μg/g) | Active Fungal Biomass (μg/g) | Total Fungal Biomass (μg/g) | Hyphal Diameter (nm) | Protozoa Numbers/g Flagellates | Amoebae | Ciliates | Total Nematode Numbers (#/g) | Percent Mycorrhizal Colonization of Root |
|---|---|---|---|---|---|---|---|---|---|---|---|
| 81618 Nelson Blown Topsoil | 0.68 OK | 26.6 Excellent! | 282 Excellent! | 10.6 Good | 11 In the past, something was done that killed the fungi. However, good recovery is occurring | 2.5 | 67,286 Excellent numbers of protozoa, good nutrient cycling is occurring which means the grass will manage quite well this winter, and be ready to green up quite nicely next spring when temperatures warm | 84,050 | 250 | 9.3 Good numbers, but only bacterial-feeders. Diversity is too low to fully protect roots | 35 OK - given total fungal results, VAM were likely negatively affected and just now recovering |
| Desired Range | Field Capacity | 1.0–5.0 | 75–100 | 1.0–5.0 | 50–75 | (A) | 5,000+ | 5,000+ | 50–100 | 10–20 | 40%–80% |

(A) Hyphal diameter of 2.0 indicates mostly actinomyccic hyphae, 2.5 indicates community is mainly ascomycete, typical soil fungi for grasslands, diameters of 3.0 or higher indicate community is dominated by highly beneficial fungi, a Basidiomycete community.

Organism Ratios

| Sample # | Total Fungal to Total Bacterial Biomass | Active to Total Fungal Biomass | Active to Total Bacterial Biomass | Active Fungal to Active Bacterial Biomass | Plant Available N Supply from Predators (lbs/ac) | Root-Feeding Nematode Presence | Leaf Organism Assay Percent Leaf Surface Covered by Bacteria | Fungi |
|---|---|---|---|---|---|---|---|---|
| 81618 Nelson Blown Topsoil | 0.04 Very bacterial because total | 0.98 Fungi are recovering so almost all the | 0.09 OK | 0.40 Bacteria are growing better | 350–400 Excellent nutrient cycling | None Detected But diversity is too low to protect | NR | NR |

-continued

Organism Ratios

| Sample # | Total Fungal to Total Bacterial Biomass | Active to Total Fungal Biomass | Active to Total Bacterial Biomass | Active Fungal to Active Bacterial Biomass | Plant Available N Supply from Predators (lbs/ac) | Root-Feeding Nematode Presence | Leaf Organism Assay Percent Leaf Surface Covered by Bacteria | Leaf Organism Assay Percent Leaf Surface Covered by Fungi |
|---|---|---|---|---|---|---|---|---|
| | fungi are killed previously and just now recovering | fungi present are growing very rapidly | | than fungi, but this is the desired situation for grass | | roots if root-feeders "come calling". Need beneficial nematode inoculum | | |
| Desired Range | (1) | (2) | (2) | (3) | (4) | (5) | (6) | (6) |

(1) Brassica: 0.2–0.5; Row crops, Grass; 0.5–1.5; Berries, Shrubs, grape: 2–5; Deciduous Trees: 5–10; Conifer: 10–100
(2) Warm spring, early summer: 0.25+; Early spring, late winter and mid-summer: 0.10 to 0.15; Fall rain: 0.15 to 0.20; Drought (Frozen: 0.05 or lower. Values greater than appropriate for season means recovery from disturbance. Value lower means disturbance killed organisms and recovery is not occurring.
(3) Generally 1:1 results in good soil aggregate structure in crop soil; 2 to 5 for deciduous trees; 5 for conifers. Values above 1:1 mean soil pH may be decreasing, values less than 1:1 means pH increasing.
(4) Based on release of N from protozoan and nematode consumption of bacteria and fungi. Often protozoa and nematodes compete for food resources. When one is high, the other may be low. Also, if predator numbers are high, the prey may have low numbers.
(5) While this assay is still being developed, we have found 70 to 80% coverage (sum of both bacterial and fungal coverage) reduces disease significantly.

Organism Biomass Data

| Sample # | Dry Weight of 1 gram Fresh Material | Active Bacterial Biomass ($\mu$g/g) | Total Bacterial Biomass ($\mu$g/g) | Active Fungal Biomass ($\mu$g/g) | Total Fungal Biomass ($\mu$g/g) | Hyphal Diameter (nm) | Protozoa Numbers/g Flagellates | Protozoa Numbers/g Amoebae | Protozoa Numbers/g Ciliates | Total Nematode Numbers (#/g) | Percent Mycorrhizal Colonization of Root |
|---|---|---|---|---|---|---|---|---|---|---|---|
| 82007 Top of Slope | 0.72 | 38.4 | 432 | 7.4 | 205 | 2.5 | 212,968 | 387,203 | 81 | 33.5 | NR |
| 82008 Bottom of Slope | 0.71 Good moisture | 31.4 Very high | 329 Very high | 5.1 A bit low | 101 Good! | 2.5 OK | 19,460 Excellent numbers. great nutrient cycling in top of slope, but anaerobic at bottom of slope. Drainage will need improvement | 64,655 | 1,946 Great numbers! Limited diversity | 11.3 | NR |
| Desired Range | Field Capacity | 10–15 | 75–100 | 10–15 | 50–75 | (A) | 5,000+ | 5,000+ | 50–100 | 10–20 | 40%–80% |

(A) Hyphal diameter of 2.0 indicates mostly actinomyccic hyphae, 2.5 indicates community is mainly ascomycete, typical soil fungi for grasslands, diameters of 3.0 or higher indicate community is dominated by highly beneficial fungi, a Basidiomycete community.

Organism Ratios

| Sample # | Total Fungal to Total Bacterial Biomass | Active to Total Fungal Biomass | Active to Total Bacterial Biomass | Active Fungal to Active Bacterial Biomass | Plant Available N Supply from Predators (lbs/ac) | Root-Feeding Nematode Presence | Leaf Organism Assay Percent Leaf Surface Covered by Bacteria | Leaf Organism Assay Percent Leaf Surface Covered by Fungi |
|---|---|---|---|---|---|---|---|---|
| 82007 | 0.47 | 0.04 | 0.09 | 0.19 | 400+ | None | NR | NR |
| 82008 | 0.31 Good for grass | 0.05 High total low | 0.10 High total low | 0.16 Very bacterial need to | 300 but N losses Anaerobic in bottom | Detected Excellent. but limited | | |

-continued

Organism Ratios

| Sample # | Total Fungal to Total Bacterial Biomass | Active to Total Fungal Biomass | Active to Total Bacterial Biomass | Active Fungal to Active Bacterial Biomass | Plant Available N Supply from Predators (lbs/ac) | Root-Feeding Nematode Presence | Leaf Organism Assay Percent Leaf Surface Covered by Bacteria | Leaf Organism Assay Percent Leaf Surface Covered by Fungi |
|---|---|---|---|---|---|---|---|---|
| | active suggests oxygen limitations | active suggests oxygen limitations | encourage fungi more. fungal food addition might be a good idea | of slope. Need drainage | diversity. Need to add an inoculum of beneficial nematodes | | | |
| Desired Range | (1) | (2) | (2) | (3) | (4) | (5) | (6) | (6) |

(1) Brassica: 0.2–0.5; Row crops, Grass; 0.5–1.5; Berries, Shrubs, grape: 2–5; Deciduous Trees: 5–10; Conifer: 10–100
(2) Warm spring, early summer: 0.25+; Early spring, late winter and mid-summer: 0.10 to 0.15; Fall rain: 0.15 to 0.20; Drought/Frozen: 0.05 or lower. Values greater than appropriate for season means recovery from disturbance. Value lower means disturbance killed organisms and recovery is not occurring.
(3) Generally 1:1 results in good soil aggregate structure in crop soil; 2 to 5 for deciduous trees; 5 for conifers. Values above 1:1 mean soil pH may be decreasing, values less than 1:1 means pH increasing.
(4) Based on release of N from protozoan and nematode consumption of bacteria and fungi. Often protozoa and nematodes compete for food resources. When one is high, the other may be low. Also, if predator numbers are high, the prey may have low numbers.
(5) While this assay is still being developed, we have found 70 to 80% coverage (sum of both bacterial and fungal coverage) reduces disease significantly.

EXAMPLE 2

Laboratory tests were completed to measure the shear strength of a soil mixture in accordance with the present invention so as to evaluate its ability to remain stable on steep slopes. This Example summarizes the testing methods and the laboratory test results.

Two types of strength testing were completed: (1) direct shear testing, and (2) tilting table tests. The direct shear test is a strength test where a soil sample is sheared across a horizontal surface. The stress required to shear the sample is recorded. This test is usually completed with the sample under some pressure. Typically, the shear strength is proportional to the applied pressure. By comparing the test results at various pressures, a friction angle of the soil can be calculated. The friction angle is a commonly used measure of shear strength for a granular (i.e., sand) soil.

For the tilting table tests, a square sample is placed on a smooth board and the board is gradually tilted. The angle at which sliding of the sample occurs is noted. In general, the tilt angle is similar to the friction angle discussed above.

The results from the direct shear tests indicate that the friction angle is about 45 degrees. For comparison, the strongest glacially deposited soils have similar friction angles. The tilting table tests indicate that the friction angle is in excess of 50 degrees. In fact, in one test, the table was tilted 72 degrees before the sample began to slide.

A soil mixture was also obesereved on a steep slope in Medina, Wash. The slope is about 100 feet high and much steeper 100 percent. We did not observe that the topsoil mix had sloughed, nor did we observe indications that there were stability problems on the slope. These observations seem to confirm that the strength of the topsoil mix is consistent with our laboratory test results. The test results indicate that the soil mixture would likely remain stable on steep slopes.

Specific test data is provided below in the following tables and in FIGS. B1–5.

Tilt Table Response
Summary of Test Data
Equipment Information:

| Mass of Pan (lb) | 0.8103 |
|---|---|
| Volume of Pan (ft³) | 0.0582 |

TILT TABLE DRY

| Trial | Mass of Dry Soil + Pan (lb) | Mass of Dry Soil (lb) | Dry Density (pcf) | φ for sliding of surface material | φ for sliding of entire block |
|---|---|---|---|---|---|
| 1 | 4.46 | 3.65 | 62.63 | 41 | 43 |
| 2 | 4.26 | 3.45 | 59.30 | NR | 39.5 |
| 3 | 4.42 | 3.61 | 61.96 | 44 | 46 |
| 4 | 4.34 | 3.53 | 60.65 | NR | 42 |
| 5 | 4.25 | 3.44 | 59.12 | 41 | 43 |

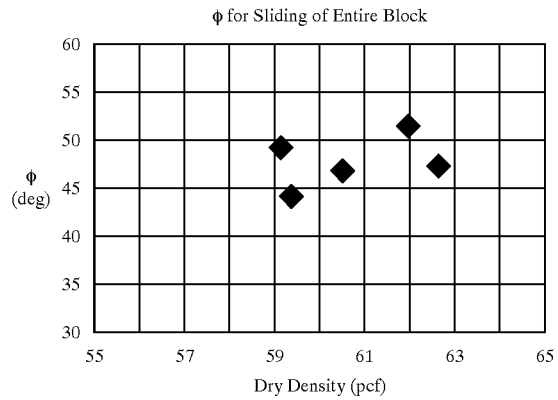

φ for Sliding of Entire Block

-continued

Tilt Table Response
Summary of Test Data
Equipment Information:

| Mass of Pan (lb) | 0.8103 |
|---|---|
| Volume of Pan (ft³) | 0.0582 |

TILT TABLE SATURATED

| Trial | Mass of Dry Soil + Pan (lb) | Mass of Dry Soil (lb) | Dry Density (pcf) | Mass of Wet Soil + Pan (lb) | Mass of Wet Soil (lb) | Wet Density (pcf) | Angle of sliding block |
|---|---|---|---|---|---|---|---|
| 1 | 4.52 | 3.71 | 63.76 | 6.33 | 5.52 | 94.86 | >50* |
| 2 | 4.23 | 3.42 | 58.75 | 5.85 | 5.04 | 86.54 | 61** |
| 3 | 4.32 | 3.51 | 60.27 | 6.19 | 5.38 | 92.39 | 72 |

*full angle not reached due to equipment failure
**soil not fully saturated, failure surface along an unsaturated plane SUMMARY OF $\phi$ FROM VARIOUS TESTING METHODS

| Angle of repose | 40 |
|---|---|
| Direct shear | 45 |
| Tilt Table Dry | 42.7 |

DIRECT SHEAR TEST NO.
SUMMARY OF TEST DATAhz,1/32

| Boring | Tested By/Date WLB 8/26/99 |
|---|---|
| Sample | Calc. By/Date WLB 8/27/99 |
| Depth ft | Check By/Date |

| CLASSIFICATION: | SPECIMEN DATA: | Before Test |
|---|---|---|
| SAMPLE DATA: | Height, inches | 1.491 |
| Spec. Grave. (est.): | Diameter, inches | 4.500 |
| 2.50 | Wet Density. pcf | 60:2 |
| Specimen: | Dry Density, pcf | 58.5 |
| UNDISTURBED | Initial Water Content, % | 3.0 |
| | Final Water Content, % | 65.4 |
| | Hanger + Lever Tare, kg | 7.01 |
| | Load on Hanger, kg | .00 |
| | Load on Lever, kg | .00 |
| | Normal Stress, tsf | .07 |
| | Shear Defl. Const. in/div | .000000 |
| | Shear Load Const., kg/div | .328 |
| | Normal Defl. Const. in/div | .001 |

| Elapsed Time min. | Shear Defl. Read div | Normal Defl. Read Div | Shear Load Read. div | Shear Displ. Inches | Normal Displ. Inches | Shear Strain % | Shear Stress tsf |
|---|---|---|---|---|---|---|---|
| 2.0 | 32.0 | 1.0 | 8.0 | .000 | .0010 | .0 | .03 |
| 5.0 | 80.0 | 2.1 | 11.0 | .000 | .0021 | .0 | .04 |
| 7.0 | 134.0 | 2.8 | 13.0 | .000 | .0028 | .0 | .04 |
| 10.0 | 224.0 | 3.1 | 16.0 | .000 | .0031 | .0 | .05 |
| 12.0 | 285.0 | 2.3 | 17.0 | .000 | .0023 | .0 | .06 |
| 15.0 | 377.0 | .8 | 19.0 | .000 | .0008 | .0 | .06 |
| 17.0 | 439.0 | −1.2 | 20.0 | .000 | −.0012 | .0 | .07 |
| 20.0 | 533.0 | −4.2 | 21.0 | .000 | −.0042 | .0 | .07 |
| 22.0 | 594.0 | −4.5 | 21.5 | .000 | −.0045 | .0 | .07 |

The above description of illustrated embodiments and Examples of the invention is not intended to be exhaustive or to limit the invention to the precise form disclosed. While specific embodiments of, and examples for, the invention are described herein for illustrative purposes, various equivalent modifications are possible within the scope of the invention, as those skilled in a relevant art will recognize. The teachings provided herein of the invention can be applied to other soil mixtures and soil placement systems.

The various embodiments described can be combined to provide further embodiments. Aspects of the invention can be modified, if necessary, to employ the systems, mixtures, and concepts of the various patents and applications described above to provide yet further embodiments of the invention.

These and other changes can be made to the invention in light to the above detailed description. In general, in the following claims, the terms should not be construed to limit the invention to the specific embodiments disclosed in the specification and the claims, but should be construed to include all soil placement systems that operate under the claims to provide a method for blowing topsoil. Accordingly, the invention is not limited by the disclosure, but instead the scope of the invention is to be determined entirely by the following claims to the invention.

What is claimed is:

1. A soil mixture adapted for use with a soil distribution system that is capable of blowing the soil mixture onto selected places associated with flat or sloped surfaces, comprising:

an organic fertilizer component that consists essentially of plant residues and a first animal excrement component, wherein the amount of the organic fertilizer component ranges from about 1 to 3 pounds per cubic yard of the soil mixture;

a feathermeal component that consists essentially of ground poultry feathers, wherein the amount of the feathermeal component ranges from about 4 to 8 pounds per cubic yard of the soil mixture;

a ⅜" minus aggregate component that includes gravel, wherein the amount of the ⅜" minus aggregate component ranges from about 1200 to 1600 pounds per cubic yard of the soil mixture;

a composted organic material component that consists essentially of sawdust and a second animal excrement component, wherein the composted organic material component includes a plurality of discrete particles with each of the plurality of particles having a length of less than ⅝ of an inch, and wherein the amount of the composted organic material component ranges from about 200 to 700 pounds per cubic yard of the soil mixture;

an organic waste component that is at least about 35% humic acid by weight, wherein the amount of the organic waste component ranges from about 20 to 30 pounds of the soil mixture;

a kelp meal component that consists essentially of ground kelp, wherein the amount of the kelp meal component ranges from about 2 to 4 pounds per cubic yard of the soil mixture;

a ground or granular rock phosphate component in an amount that ranges from about 0.5 to 3 pounds per cubic yard of the soil mixture;

a sand component in an amount that ranges from about 100 to 700 pounds per cubic yard of the soil mixture; and a sawdust component in an amount ranging from about 155 to 300 pounds per cubic yard of the soil mixture.

2. The soil mixture of claim 1 wherein the organic fertilizer component has a NPK rating of about 6-4-4.

3. The soil mixture of claim 1 wherein the feathermeal component has a NPK rating of about 12-1-0.

4. The soil mixture of claim 1 wherein the sand component is greensand.

5. The soil mixture of claim 1 wherein the first and second animal excrements are the same or different.

6. The soil mixture of claim 1, further comprising a bloodmeal component in an amount that ranges up to about 3 pounds per cubic yard of the soil mixture.

7. The soil mixture of claim 6, wherein the blood meal component has a NPK rating of about 13-1-0.

8. The soil mixture of claim 1, further comprising a diatomaceous earth component in an amount ranging up to about 500 pounds per cubic yard of the soil mixture.

9. The soil mixture of claim 1, further comprising a corn gluten component in an amount ranging up to about 8 pounds per cubic yard of the soil mixture.

10. The soil mixture of claim 1, further comprising a plurality of mycorrhiza spores.

11. The soil mixture of claim 1, further comprising lime in an amount ranging up to about 3 pounds per cubic yard of the soil mixture.

12. The soil mixture of claim 1, further comprising an aerobic compost tea in an amount ranging up to about 5 gallons per cubic yard of the soil mixture.

13. A method of establishing a stable and fertile topsoil layer on a sloped surface comprising:
   providing a fertile soil blend that includes:
      an organic fertilizer component that consists essentially of plant residues and a first animal excrement component, wherein the amount of the organic fertilizer component ranges from about 1 to 3 pounds per cubic yard of the soil mixture;
      a feathermeal component that consists essentially of ground poultry feathers, wherein the amount of the feathermeal component ranges from about 4 to 8 pounds per cubic yard of the soil mixture;
      a ⅜" minus aggregate component that includes gravel, wherein the amount of the ⅜" minus aggregate component ranges from about 1200 to 1600 pounds per cubic yard of the soil mixture;
      a composted organic material component that consists essentially of sawdust and a second animal excrement component, wherein the composted organic material component includes a plurality of discrete particles with each of the plurality of particles having a length of less than ⅝ of an inch, and wherein the amount of the composted organic material component ranges from about 200 to 700 pounds per cubic yard of the soil mixture;
      an organic waste component that is at least about 35% humic acid by weight, wherein the amount of the organic waste component ranges from about 20 to 30 pounds of the soil mixture;
      a kelp meal component that consists essentially of ground kelp, wherein the amount of the kelp meal component ranges from about 2 to 4 pounds per cubic yard of the soil mixture;
      a ground or granular rock phosphate component in an amount that ranges from about 0.5 to 3 pounds per cubic yard of the soil mixture;
      a sand component in an amount that ranges from about 100 to 700 pounds per cubic yard of the soil mixture; and
      a sawdust component in an amount ranging from about 155 to 300 pounds per cubic yard of the soil mixture; and
   distributing the fertile soil blend on a sloped surface to establish a stable and fertile topsoil layer on the surface.

14. The method of claim 13 wherein distributing the fertile soil blend on the sloped surface comprises blowing the blend onto the surface.

15. The method of claim 13 further comprising exposing the minus ⅜" aggregate component at a surface of the established topsoil layer throughout substantially the entire surface of the topsoil layer and exposing the topsoil layer to rain such that the aggregate component diffuses the impact of the rain preventing it from eroding and destablizing the fertilizing components of the soil blend.

16. The method of claim 13 wherein the fertile soil blend contains less than 30% relative moisture content prior to distribution on the sloped surface and wherein distributing the fertile soil blend comprises blowing the soil onto the sloped surface.

17. The method of claim 13 wherein the organic fertilizer component has a NPK rating of about 6-4-4.

18. The method of claim 13 wherein the feathermeal component has a NPK rating of about 12-1-0.

19. The method of claim 13 wherein the sand component is greensand.

20. The method of claim 13 wherein the first and second animal excrements are the same or different.

21. The method of claim 13, further comprising a bloodmeal component in an amount that ranges up to about 3 pounds per cubic yard of the soil mixture.

22. The method of claim 21, wherein the blood meal component has a NPK rating of about 13-1-0.

23. The method of claim 13, further comprising a diatomaceous earth component in an amount ranging up to about 500 pounds per cubic yard of the soil mixture.

24. The method of claim 13, further comprising a corn gluten component in an amount ranging up to about 8 pounds per cubic yard of the soil mixture.

25. The method of claim 13, further comprising a plurality of mycorrhiza spores.

26. The method of claim 13, further comprising lime in an amount ranging up to about 3 pounds per cubic yard of the soil mixture.

27. The method of claim 13, further comprising an aerobic compost tea in an amount ranging up to about 5 gallons per cubic yard of the soil mixture.

\* \* \* \* \*